(12) United States Patent
Shimizu et al.

(10) Patent No.: US 8,107,025 B2
(45) Date of Patent: *Jan. 31, 2012

(54) DISPLAY UNIT HAVING ILLUMINATOR AND LIQUID CRYSTAL LAYER CAPABLE OF FORMING INTERMEDIATE LAYER

(75) Inventors: Masahiro Shimizu, Kizugawa (JP); Kiyoshi Minoura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1144 days.

This patent is subject to a terminal disclaimer.

(21) Appl. No.: 11/887,163

(22) PCT Filed: Mar. 28, 2006

(86) PCT No.: PCT/JP2006/306331
§ 371 (c)(1),
(2), (4) Date: Sep. 26, 2007

(87) PCT Pub. No.: WO2006/104160
PCT Pub. Date: Oct. 5, 2006

(65) Prior Publication Data
US 2009/0051836 A1   Feb. 26, 2009

(30) Foreign Application Priority Data

Mar. 29, 2005   (JP) .................................. 2005-094423

(51) Int. Cl.
*G02F 1/133* (2006.01)
(52) U.S. Cl. .............. 349/33; 349/62; 349/71; 349/167; 349/178
(58) Field of Classification Search .................. 349/33, 349/62, 71, 167, 178
See application file for complete search history.

(56) References Cited

U.S. PATENT DOCUMENTS

| 5,706,066 A | 1/1998 | Sawayama et al. |
| 2004/0196230 A1 | 10/2004 | Nose et al. |
| 2006/0164580 A1* | 7/2006 | Ueda et al. ................... 349/117 |

FOREIGN PATENT DOCUMENTS

JP    59-058421    4/1984
(Continued)

OTHER PUBLICATIONS

Gao et al.: "Strongly Photoluminescent CdTe Nanocrystals by Proper Surface Modification," *American Chemical Society*, Oct. 1998, pp. 8360-8363.

(Continued)

*Primary Examiner* — Nathanael R Briggs
(74) *Attorney, Agent, or Firm* — Nixon & Vanderhye P.C.

(57) ABSTRACT

A display device includes a liquid crystal layer having opposing principal faces; a plurality of electrodes; and an illuminator for emitting light toward one of the principal faces of the liquid crystal layer. When a predetermined voltage is applied, the liquid crystal layer forms an intermediate layer containing liquid crystal molecules which are oriented in a different direction from that of the liquid crystal molecules in an anchoring layer, and causes linearly-polarized light which has been transmitted through the anchoring layer to be refracted toward the one principal face in or near the intermediate layer. White is displayed while no voltage is applied across the liquid crystal layer, and black displaying is conducted while a voltage is applied across the liquid crystal layer.

20 Claims, 16 Drawing Sheets

FOREIGN PATENT DOCUMENTS

| | | |
|---|---|---|
| JP | 63-116121 | 5/1988 |
| JP | 08-254719 | 10/1996 |
| JP | 08-254719 A | 10/1996 |
| JP | 09-258275 A | 10/1997 |
| JP | 2000-171813 | 6/2000 |
| JP | 2003-195261 A | 7/2003 |

OTHER PUBLICATIONS

International Search Report (PCT) mailed Jul. 4, 2006.
English translation of the International Preliminary Report on Patentability mailed Nov. 22, 2007 in corresponding PCT Application No. PCT/JP2006/306331.

* cited by examiner

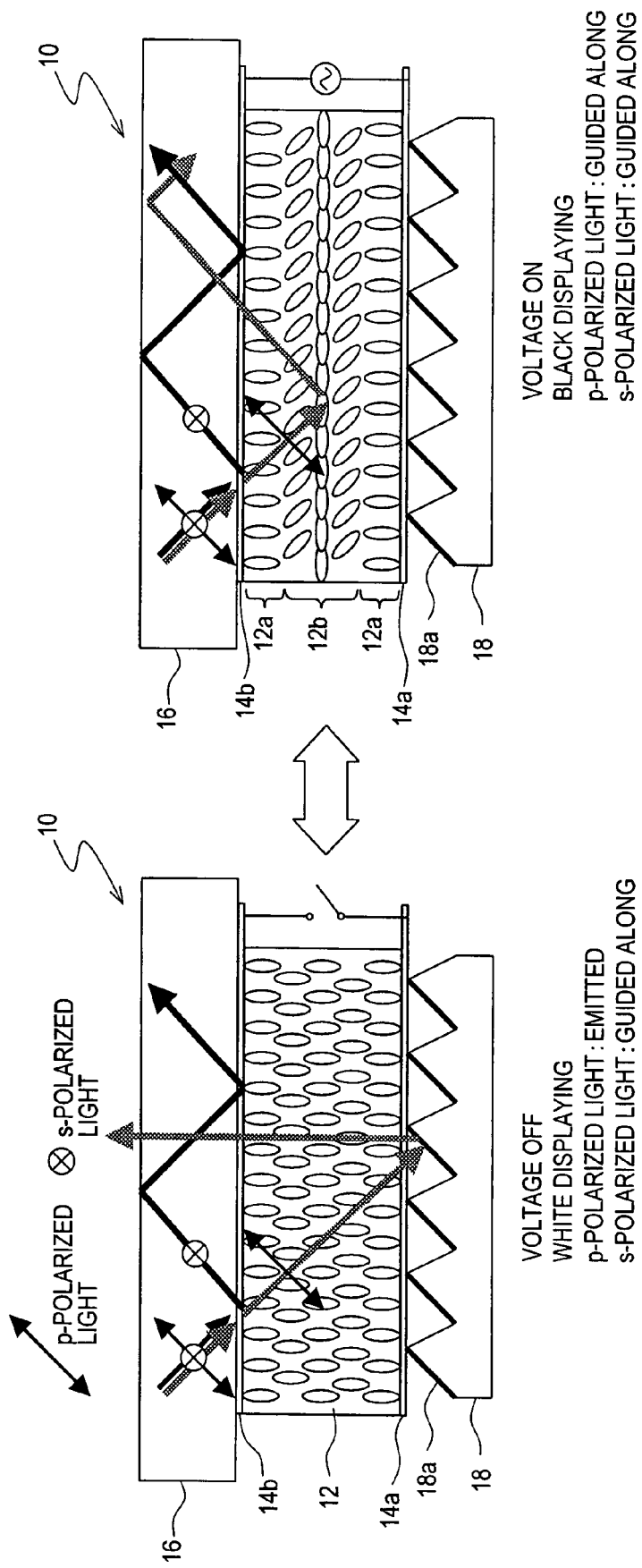

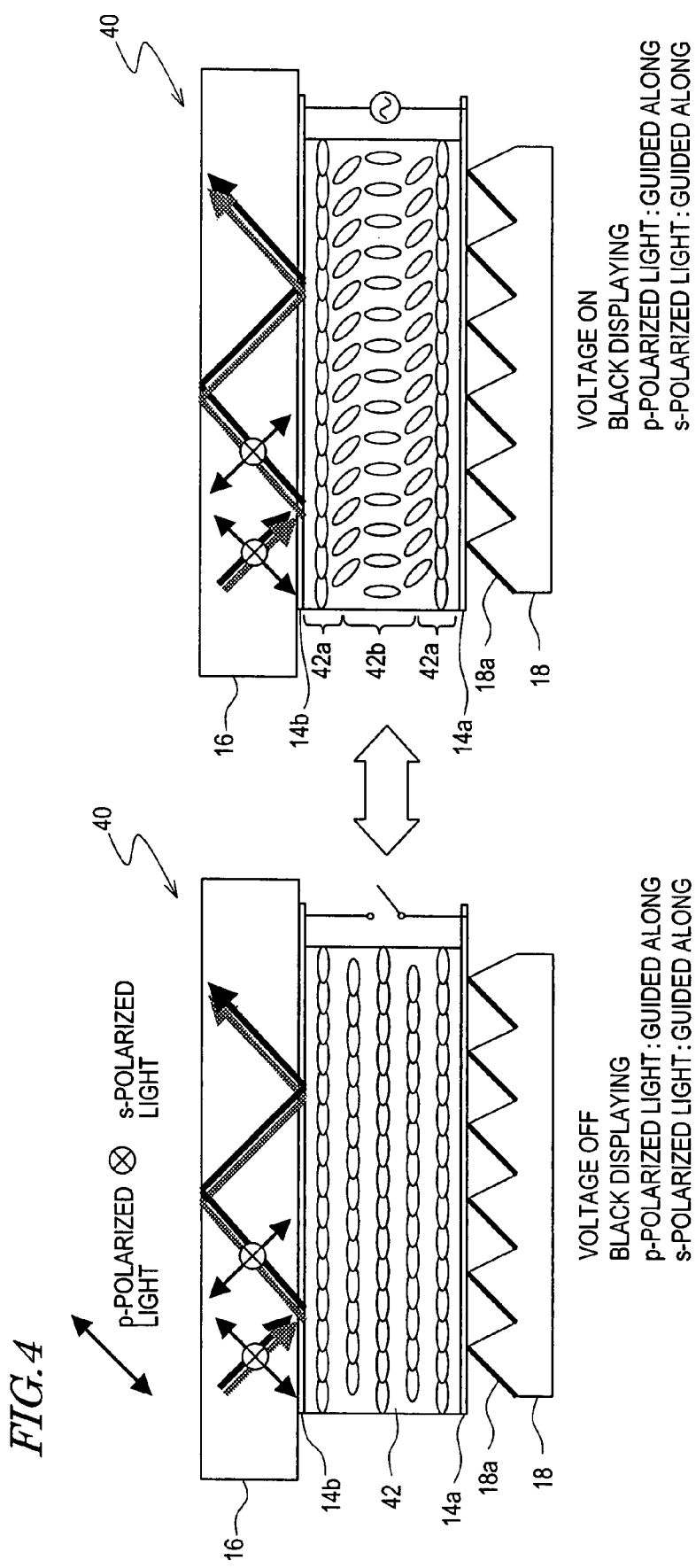

DISPLAY UNIT HAVING ILLUMINATOR AND LIQUID CRYSTAL LAYER CAPABLE OF FORMING INTERMEDIATE LAYER

This application is the U.S. national phase of International Application No. PCT/JP2006/306331 filed 28 Mar. 2006 which designated the U.S. and claims priority to JP 2005-094423 filed 29 Mar. 2005, the entire contents of each of which are hereby incorporated by reference.

TECHNICAL FIELD

The present invention relates to a display device, and in particular to a display device incorporating a liquid crystal layer.

BACKGROUND ART

As flat panel displays featuring thinness, light weight, etc., liquid crystal display devices have recently been used widely for liquid crystal television devices, monitor devices, mobile phones, and the like. However, the liquid crystal display devices which are now used most widely are of a type that uses one or two polarizers, which invites the problem of low efficiency of light utilization.

As displaying methods which do not use polarizers, a method utilizing a guest-host liquid crystal and a method utilizing a polymer dispersed liquid crystal have been proposed in the past. However, because of disadvantages such as a low contrast ratio and a high driving voltage, these methods are yet to be put to practical use.

Furthermore, as another displaying method which does not use polarizers, a method of controlling total reflection/transmission at an interface between a liquid crystal layer and a substrate or a light guiding plate (hereinafter referred to as "total-reflection type") has been proposed.

For example, Patent Document 1 discloses a display device which, by varying the orientation state of a liquid crystal layer, switches between a state where light propagating through a light guiding plate which is disposed adjacent to the liquid crystal layer is totally reflected at an interface between the liquid crystal layer and the light guiding plate or a state where it is transmitted, thus conducting black displaying in the total reflection state or conducting white displaying in the transmitting state. White displaying is realized by allowing the light which is emitted from the light guiding plate to be scattered by a scattering plate. A liquid crystal display device disclosed in Patent Document 2 includes a light guide, a liquid crystal layer, and a reflective film in this order, and by varying the orientation state of the liquid crystal layer, switches between a state where light entering the liquid crystal layer from the light guide is totally reflected at an interface between the liquid crystal layer and the light guide or a state where it is transmitted, and conducts white displaying by reflecting light which has been transmitted through the interface toward a viewer with a reflective film. Furthermore, Patent Document 3 discloses a display device which, by using as a light guiding plate a transparent substrate containing a fluorophore, conducts displaying by switching between a state of totally reflecting fluorescence which is emitted from the light guiding plate or a state where it is transmitted, in a manner similar to Patent Document 1.

[Patent Document 1] Japanese Laid-Open Patent Publication No.
[Patent Document 2] Japanese Laid-Open Patent Publication No. 2000-171813
[Patent Document 3] Japanese Laid-Open Patent Publication No. 63-116121

DISCLOSURE OF INVENTION

Problems to be Solved by the Invention

The total-reflection type display devices which are disclosed in Patent Documents 1 to 3 change the orientation state of the liquid crystal layer as a way of switching between a state where light is totally reflected at an interface between the liquid crystal layer and the light guide adjacent to the liquid crystal layer or a state where it is transmitted, thus resulting in a problem of high driving voltage. The orientations of the liquid crystal molecules near the interface of the liquid crystal layer are restricted by a surface (typically an alignment film) which the liquid crystal molecules are in contact with, and do not change unless a relatively high voltage is applied. A layer composed of the liquid crystal molecules near the interface, which are unwilling to respond to voltage (having a thickness on the order of several hundred nm), is generally referred to as an anchoring layer. In order to change the orientations of the liquid crystal molecules in the anchoring layer, a voltage of several ten volts to several hundred volts is necessary, for example.

It is impossible to industrially produce an active matrix type display device by using transistors that operate with such a high voltage.

The present invention has been made in view of the above problems. A main objective of the present invention is to provide a display device which, without requiring a high driving voltage as does a conventional total-reflection type display device, presents display by changing the orientation state of a liquid crystal layer, thus switching between a transmitting state or a non-transmitting state for light entering the liquid crystal layer.

Means for Solving the Problems

A display device according to the present invention comprises: a liquid crystal layer having a first principal face and a second principal face opposing each other; a plurality of electrodes for applying a voltage across the liquid crystal layer; and an illuminator for emitting light toward one of the first principal face and the second principal face of the liquid crystal layer, wherein, when a predetermined voltage is applied, the liquid crystal layer forms an intermediate layer containing liquid crystal molecules which are oriented in a different direction from that of liquid crystal molecules in an anchoring layer near the one principal face, and causes linearly-polarized light which has been transmitted through the anchoring layer near the one principal face to be refracted toward the one principal face in or near the intermediate layer; and white is displayed while no voltage is applied across the liquid crystal layer, and black displaying is conducted while a voltage is applied across the liquid crystal layer.

In one embodiment, a refractive index of the intermediate layer with respect to the linearly-polarized light which has been transmitted through the anchoring layer is smaller than a refractive index of the anchoring layer.

In one embodiment, the linearly-polarized light which is emitted from the illuminator toward the one principal face has a component which is parallel to major axes of the liquid crystal molecules in the anchoring layer.

In one embodiment, the liquid crystal layer is a vertical-alignment type liquid crystal layer containing liquid crystal molecules having positive dielectric anisotropy; the plurality of electrodes are a plurality of electrodes for applying a lateral electric field across the liquid crystal layer; and the linearly-polarized light is p-polarized light.

In one embodiment, the liquid crystal layer is a vertical-alignment type liquid crystal layer containing liquid crystal molecules having negative dielectric anisotropy; the plurality of electrodes are a plurality of electrodes disposed so as to oppose each other via the liquid crystal layer; and the linearly-polarized light is p-polarized light.

In one embodiment, the liquid crystal layer is a horizontal-alignment type liquid crystal layer containing liquid crystal molecules having positive dielectric anisotropy; the plurality of electrodes are a plurality of electrodes for applying a lateral electric field across the liquid crystal layer; and the linearly-polarized light is s-polarized light.

In one embodiment, the liquid crystal layer is a horizontal-alignment type liquid crystal layer containing liquid crystal molecules having positive dielectric anisotropy; the plurality of electrodes are a plurality of electrodes disposed so as to oppose each other via the liquid crystal layer; and the linearly-polarized light is s-polarized light.

In one embodiment, the illuminator is disposed on the second principal face side of the liquid crystal layer; and the display device further comprises an oblique reflective layer provided on the first principal face side of the liquid crystal layer.

In one embodiment, a light absorbing layer is further comprised on the opposite side of the oblique reflective layer from the liquid crystal layer.

In one embodiment, the illuminator is disposed on the first principal face side of the liquid crystal layer; and the display device further comprises a first oblique reflective layer provided between the illuminator and the first principal face of the liquid crystal layer.

In one embodiment, a light absorbing layer is further comprised on the liquid crystal layer side of the first oblique reflective layer.

In one embodiment, a second oblique reflective layer or scattering layer provided on the second principal face side of the liquid crystal layer is further comprised.

In one embodiment, the illuminator includes a light source and a light guiding plate.

In one embodiment, the illuminator further includes a polarization-selective film between the light source and the light guiding plate.

In one embodiment, the illuminator further includes a reflective layer disposed so as to oppose the light source via the light guiding plate.

In one embodiment, the illuminator further includes a ¼ wavelength plate between the reflective layer and the light guiding plate.

In one embodiment, a color filter layer disposed on a front face side of the liquid crystal layer is further comprised, wherein the illuminator is disposed on a rear face side of the liquid crystal layer.

In one embodiment, the illuminator includes: a light guiding plate of a parallel plate type, having a plurality of holes on a rear face thereof; a reflecting structure provided in each of the plurality of holes; and a plurality of light sources each emitting light toward the reflecting structure.

In one embodiment, a light absorbing layer is further comprised on the rear face side of the light guiding plate.

In one embodiment, a layer having a lower refractive index than that of the light guiding plate is provided between the light guiding plate and the light absorbing layer.

Effects of the Invention

A liquid crystal layer of the display device according to the present invention causes linearly-polarized light that has been transmitted through an anchoring layer to be refracted at an intermediate layer while a predetermined voltage is applied, thus allowing the light to be refracted back in its incident direction. The liquid crystal layer acts as if to totally reflect the incident linearly-polarized light. In the display device according to the present invention, it is only necessary that the refractive index of the intermediate layer in the liquid crystal layer with respect to the linearly-polarized light be different from the refractive index of the anchoring layer; that is, the orientation state of the anchoring layer does not need to change. Thus, the display device according to the present invention is capable of presenting display by switching between a transmitting state and a non-transmitting state with respect to light entering the liquid crystal layer, with a voltage which is low enough to permit use of conventional transistors.

BRIEF DESCRIPTION OF DRAWINGS

FIG. 1A A schematic diagram for explaining the construction and operation of a liquid crystal display device 10 according to an embodiment of the present invention.

FIG. 4 A schematic diagram for explaining the construction and operation of a liquid crystal display device 40 as a comparative example.

Figure 1B:
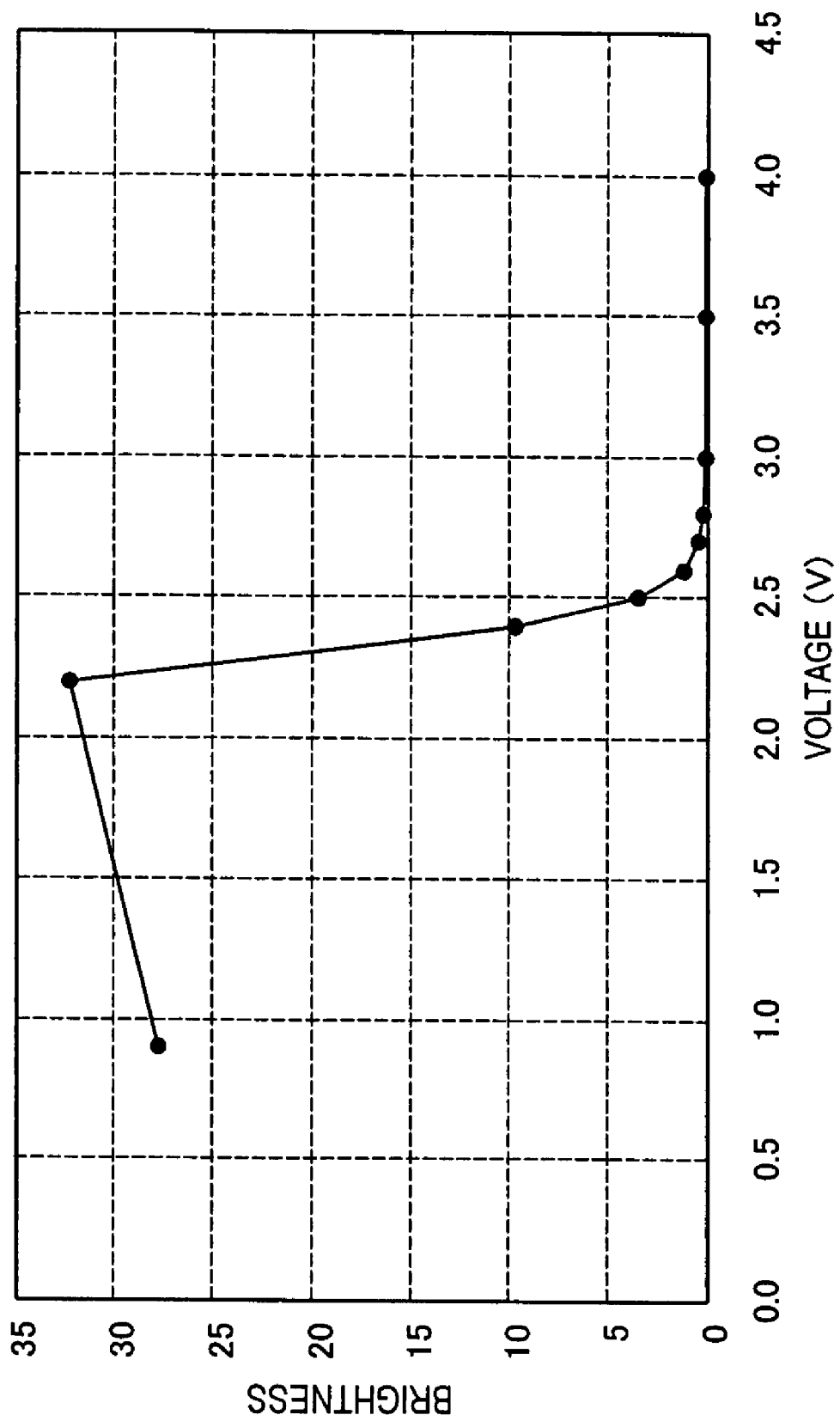
FIG. 1B A graph showing brightness, against driving voltage, of the liquid crystal display device 10 according to an embodiment of the present invention.

DESCRIPTION OF THE REFERENCE NUMERALS 12 liquid crystal layer
12a anchoring layer
12b intermediate layer
14a, 14b electrode
16 light guiding plate
18 reflector
18a oblique reflective layer

BEST MODE FOR CARRYING OUT THE INVENTION

Hereinafter, the construction and operation display devices according to embodiments of the present invention will be described with reference to the drawings.

First, the operation principles of the display device according to the present invention will be described in comparison with the aforementioned conventional total-reflection type liquid crystal display device.

Figure 13:
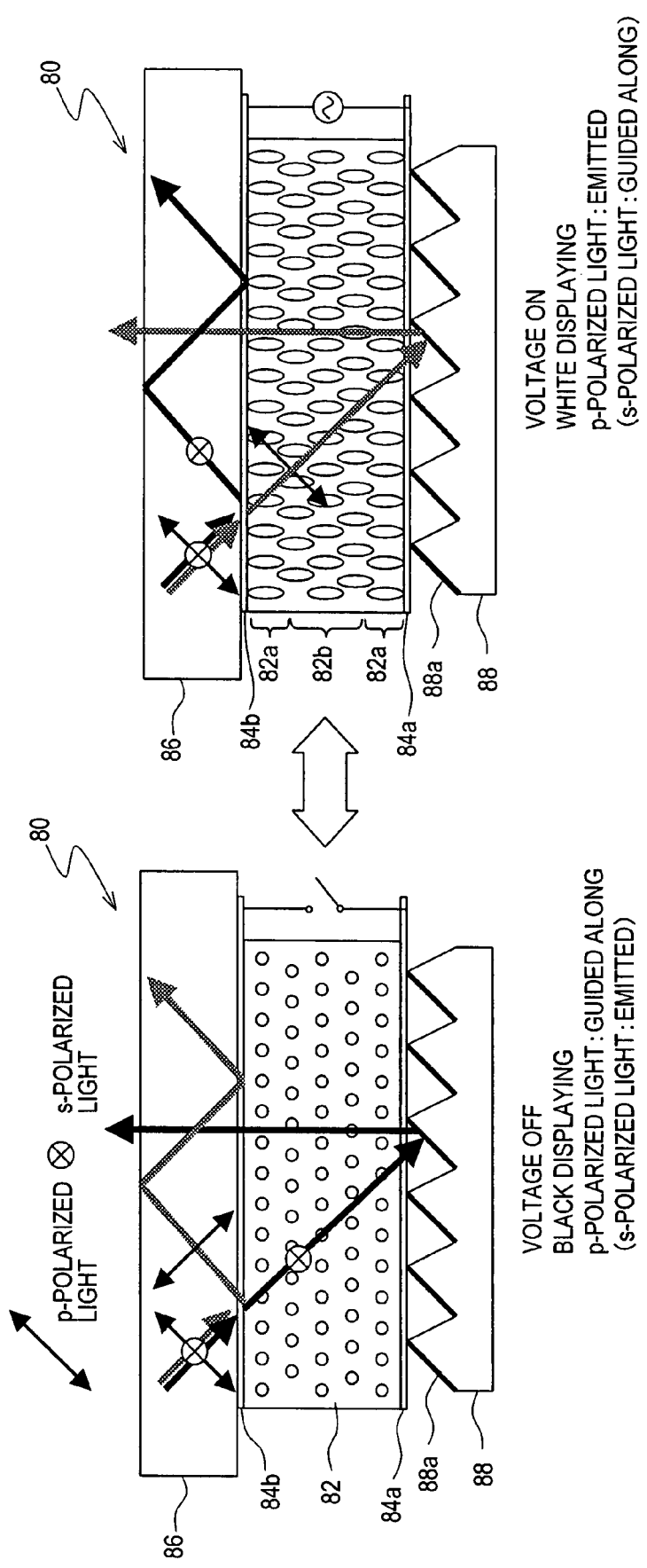
FIG. 13 A schematic diagram for explaining the operation of a conventional total-reflection type liquid crystal display device 80.

FIG. 13 is a schematic diagram for explaining the operation of a conventional total-reflection type liquid crystal display device 80, where the left-hand side shows a state in the absence of an applied voltage (voltage OFF), and the right-hand side shows a state under an applied voltage (voltage ON). The liquid crystal display device described in Patent Document 1, supra, operates in a similar manner to the liquid crystal display device 80.

The liquid crystal display device 80 includes: a liquid crystal layer 82 of a horizontal-alignment type; electrodes 84a and 84b for applying a voltage across the liquid crystal layer 82; a light guiding plate 86 disposed adjacent to the liquid crystal layer 82 and on the viewer's side (which may also be referred to as the "front face side") of the liquid crystal layer 82; and a reflector 88 disposed on the opposite side from the viewer's side of the liquid crystal layer 82 (which may also be referred to as the "rear face side"). The reflector 88 includes oblique reflective layers 88a which are slanted with respect to the display surface (liquid crystal layer plane), and reflects light which has been transmitted through the liquid crystal layer 82 toward the front face side.

Light (containing p-polarized light and s-polarized light) which is emitted from a light source (not shown) propagates within the light guiding plate 86. Herein, a refractive index ns of the light guiding plate 86 is prescribed to be approximately equal to an extraordinary refractive index ne of the liquid crystal molecules composing the liquid crystal layer 82 (=n∥: a refractive index along a direction which is parallel to the major axis of the liquid crystal molecules) (ns≈ne). The liquid crystal molecules composing the liquid crystal layer 82 have positive dielectric anisotropy ($\Delta\epsilon$>0), with the relationship ne>no (where no is an ordinary refractive index (=n⊥: a refractive index along a direction which is orthogonal to the major axis of the liquid crystal molecules)).

Paying attention to p-polarized light, the refractive index of the liquid crystal layer 82 with respect to the p-polarized light propagating within the light guiding plate 86 is no in the absence of an applied voltage (left-hand side in the figure). Therefore, the p-polarized light is totally reflected at the interface between the light guiding plate 86 and the liquid crystal layer 82 satisfying the relationship ns≠no, and propagates within the light guiding plate 86 without entering into the liquid crystal layer 82. On the other hand, under an applied voltage (right-hand side in the figure), the refractive index of the liquid crystal layer 82 with respect to the p-polarized light propagating within the light guiding plate 86 is approximately ne. Therefore, the p-polarized light is transmitted through the liquid crystal layer 82, without being totally reflected at the interface between light guiding plate 86 and the liquid crystal layer 82 satisfying the relationship ns≈ne. The light having been transmitted through the liquid crystal layer 82 is reflected by the oblique reflective layers 88a so as to be emitted toward the viewer's side. By thus using p-polarized light, it is possible to conduct black displaying in a voltage-OFF state or white displaying in a voltage-ON state.

However, in order to eliminate reflection at the interface between the light guiding plate 86 and the liquid crystal layer 82, it is necessary to not only align the liquid crystal molecules in an intermediate layer 82b which is located intermediate along the thickness direction of the liquid crystal layer 82, but also essentially perpendicularly align the liquid crystal molecules in an anchoring layer 82a near the interface on the light guiding plate 86 side. Since a voltage as high as several ten volts or more is necessary for changing the orientations of the liquid crystal molecules in the anchoring layer 82a, it is impossible to industrially produce an active matrix type display device employing transistors.

Paying attention to s-polarized light, the refractive index of the liquid crystal layer 82 with respect to the s-polarized light propagating within the light guiding plate 86 is ne in the absence of an applied voltage. Therefore, the s-polarized light is transmitted through the liquid crystal layer 82 without being totally reflected at the interface between the light guiding plate 86 and the liquid crystal layer 82 satisfying the relationship ns≈ne, and thereafter is reflected by the oblique reflective layers 88a so as to be emitted toward the viewer's side. On the other hand, under an applied voltage, the refractive index of the liquid crystal layer 82 with respect to s-polarized light is no (≠ns), and therefore the s-polarized light is totally reflected at the interface between the light guiding plate 86 and the liquid crystal layer 82. This is opposite to the aforementioned behavior of p-polarized light. Therefore, although not described in Patent Document 1, it is necessary to eliminate the s-polarized light in order to perform the aforementioned displaying operation by using p-polarized light.

Next, with reference to FIG. 14, the operation of another conventional total-reflection type liquid crystal display device 90 will be described. The liquid crystal display devices described in Patent Documents 2 and 3, supra, operate in similar manners to the liquid crystal display device 90.

The liquid crystal display device 90 differs from the liquid crystal display device 80 in that it includes a vertical-alignment type liquid crystal layer 92 as the liquid crystal layer. In FIG. 14, constituent elements having the same functions as those of the constituent elements of the liquid crystal display device 80 are denoted by the same reference numerals, and the descriptions thereof are omitted herein.

The liquid crystal molecules in the liquid crystal layer 92 have the same refractive indices (ne and no) as those of the liquid crystal molecules in the liquid crystal layer 82, such that the refractive index ns of the light guiding plate 86 is prescribed to be approximately equal to the extraordinary refractive index ne (=n∥) of the liquid crystal molecules composing the liquid crystal layer 82 (ns≈ne). However, the liquid crystal molecules in the liquid crystal layer 92 have negative dielectric anisotropy.

Figure 14:
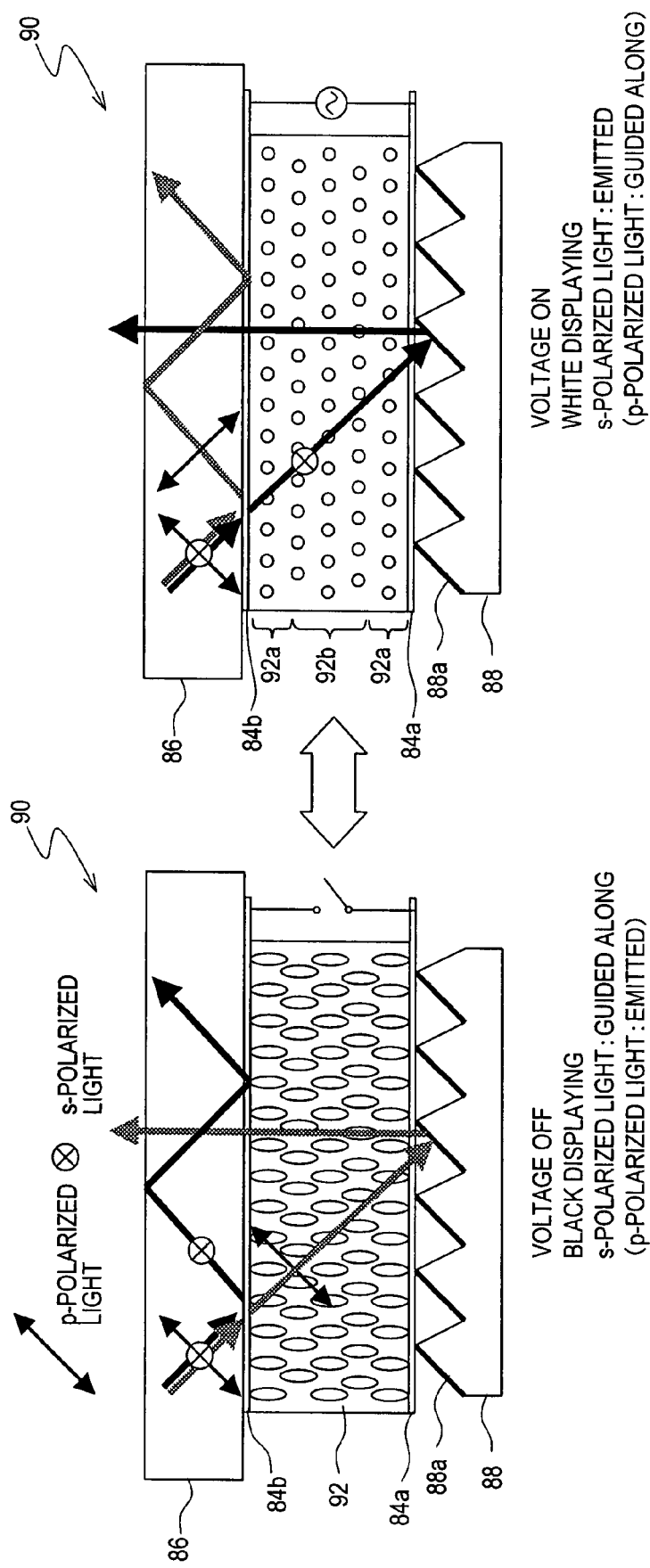
FIG. 14 A schematic diagram for explaining the operation of another conventional total-reflection type liquid crystal display device 90.

As shown on the left-hand side of FIG. 14, the liquid crystal molecules in the liquid crystal layer 92 are perpendicularly aligned in the absence of an applied voltage, and the refractive index of the liquid crystal layer 92 with respect to the s-polarized light propagating within the light guiding plate 86 is no in the absence of an applied voltage. Therefore, the s-polarized light is totally reflected at the interface between the light guiding plate 86 and the liquid crystal layer 92 satisfying the relationship ns≠no, and propagates within the light guiding plate 86 without entering into the liquid crystal layer 92. On the other hand, under an applied voltage (right-hand side in the figure), the refractive index of the liquid crystal layer 92 with respect to the s-polarized light propagating within the light guiding plate 86 is approximately ne. Therefore, the s-polarized light is transmitted through the liquid crystal layer 92, without being totally reflected at the interface between the light guiding plate 86 and the liquid crystal layer 92 satisfying the relationship ns≈ne. The light having been transmitted through the liquid crystal layer 92 is reflected by the oblique reflective layers 88a so as to be emitted toward the viewer's side. Thus, by using s-polarized light, it is possible to conduct black displaying in a voltage-OFF state or white displaying in a voltage-ON state.

In the liquid crystal display device 90, too, in order to eliminate reflection at the interface between the light guiding plate 86 and the liquid crystal layer 92, it is necessary to not only align the liquid crystal molecules in an intermediate layer 92b which is located intermediate along the thickness direction of the liquid crystal layer 92, but also essentially horizontally align the liquid crystal molecules in an anchoring layer 92a near the interface on the light guiding plate 86 side. Since a voltage as high as several ten volts or more is necessary for changing the orientations of the liquid crystal molecules in the anchoring layer 92a, it is impossible to industrially produce an active matrix type display device employing transistors.

Paying attention to p-polarized light, the refractive index of the liquid crystal layer 92 with respect to the p-polarized light propagating within the light guiding plate 86 is ne in the absence of an applied voltage. Therefore, the p-polarized light is transmitted through the liquid crystal layer 92 without being totally reflected at the interface between the light guiding plate 86 and the liquid crystal layer 92 satisfying the relationship ns≈ne, and thereafter is reflected by the oblique reflective layers 88a so as to be emitted toward the viewer's side. On the other hand, under an applied voltage, the refractive index of the liquid crystal layer 92 with respect to p-polarized light is no (≠ns), and therefore the p-polarized light is totally reflected at the interface between the light guiding plate 86 and the liquid crystal layer 92. This is opposite to the aforementioned behavior of s-polarized light. Therefore, although not described in Patent Documents 2 and 3, it is necessary to eliminate the p-polarized light in order to perform the aforementioned displaying operation by using s-polarized light.

Unlike in the aforementioned conventional total-reflection type liquid crystal display devices, in the liquid crystal display devices according to embodiments of the present invention, the liquid crystal layer causes linearly-polarized light that has been transmitted through an anchoring layer to be refracted at an intermediate layer while a predetermined voltage is applied, thus allowing the light to be refracted back in its incident direction. The liquid crystal layer acts as if to totally reflect the incident linearly-polarized light. In the liquid crystal display devices according to embodiments of the present invention, it is only necessary that the refractive index of the intermediate layer in the liquid crystal layer with respect to the linearly-polarized light be different from the refractive index of the anchoring layer; that is, the orientation state of the anchoring layer does not need to change. Thus, liquid crystal display devices according to embodiments of the present invention can be driven with a voltage which is low enough to permit use of conventional transistors. Moreover, a liquid crystal display device according to the present invention displays white while no voltage is applied across the liquid crystal layer, or conducts black displaying while a voltage is applied across the liquid crystal layer.

With reference to FIG. 1A, FIG. 1B, FIG. 2, and FIG. 3, the construction and operation of a liquid crystal display device according to an embodiment of the present invention will be described in detail.

The liquid crystal display device 10 of the embodiment shown in FIG. 1A includes: a vertical-alignment type liquid crystal layer 12; electrodes 14a and 14b for applying a voltage across the liquid crystal layer 12; a light guiding plate 16 disposed on the front face side of the liquid crystal layer 12 and adjacent to the liquid crystal layer 12; and a reflector 18 disposed on the rear face side of the liquid crystal layer 12. The reflector 18 includes oblique reflective layers 18a which are slanted with respect to the display surface (liquid crystal layer plane), and reflects light which has been transmitted through the liquid crystal layer 12 toward the front face side.

Light (containing p-polarized light and s-polarized light) which is emitted from a light source (not shown) propagates within the light guiding plate 16. Herein, a refractive index ns of the light guiding plate 16 is prescribed to be approximately equal to an extraordinary refractive index ne (=n∥) of the liquid crystal molecules composing the liquid crystal layer 12 (ns≈ne). The liquid crystal molecules composing the liquid crystal layer 12 have negative dielectric anisotropy (Δ∈<0) and positive refractive index anisotropy (ne>no).

Paying attention to p-polarized light, the refractive index of the liquid crystal layer 12 with respect to the p-polarized light propagating within the light guiding plate 16 is approximately ne in the absence of an applied voltage (left-hand side in the figure). Therefore, the p-polarized light is transmitted through the liquid crystal layer 12, without being totally reflected at the interface between the light guiding plate 16 and the liquid crystal layer 12 satisfying the relationship ns≈ne. The light which has been transmitted through the liquid crystal layer 12 is reflected by the oblique reflective layers 18a so as to be emitted toward the viewer's side.

On the other hand, under an applied voltage (right-hand side in the figure), a voltage which is lower than those in the above-described conventional techniques is applied. Therefore, the orientation state of anchoring layers 12a does not change, but only the orientation state of an intermediate layer 12b changes. Hence, also under an applied voltage, the refractive index of the anchoring layers 12a with respect to p-polarized light is approximately ne, and the p-polarized light enters the liquid crystal layer 12 without being totally reflected at the interface between the light guiding plate 16 and the liquid crystal layer 12 satisfying the relationship ns≈ne. The refractive index with respect to the p-polarized light gradually decreases from the anchoring layers 12a toward the intermediate layer 12b, and approaches no. In or near the intermediate layer 12b where the refractive index changes, the p-polarized light is gradually refracted so as to be directed toward the front face side. This action of the liquid crystal layer 12 makes the p-polarized light appear as if totally reflected within the liquid crystal layer 12 (this phenomenon is similar to seeing a mirage). The light which has been refracted within the liquid crystal layer 12 and directed toward the light guiding plate 16 propagates within the light guiding plate 16, and is not emitted toward the viewer's side. Note that, since the incident angle of the light which is used for displaying has a tilt of 0° to 20° (essentially horizontal) with respect to the interface, a similar action can be obtained even if the tilting direction of the liquid crystal molecules is not in the illustrated direction.

Thus, by using p-polarized light, the liquid crystal display device 10 is able to conduct white displaying in a voltage-OFF state or conduct black displaying in a voltage-ON state.

Note that, in the liquid crystal display device 10, s-polarized light is totally reflected at the interface between the light guiding plate 16 and the liquid crystal layer 12, irrespective of whether the voltage is ON or OFF. The reason is that the refractive index of the anchoring layers 12a of the liquid crystal layer 12 with respect to s-polarized light is no (≠ns), irrespective of whether the voltage is ON or OFF. Therefore, unlike in the above-described conventional techniques, it is unnecessary to separately provide any construction for eliminating the polarized light which is not used for displaying.

FIG. 1B shows a relationship between the driving voltage and brightness of the liquid crystal display device 10 shown in FIG. 1A. As is clear from FIG. 1B, the liquid crystal display device 10 can be driven with a voltage of 4 volts or less. Thus, the liquid crystal display device 10 presents display by utilizing "refraction" within the liquid crystal layer 12 by applying a voltage which does not change the orientation state of the anchoring layers 12a, and therefore can be driven with a voltage which is low enough to permit use of conventional transistors.

Next, with reference to FIG. 2, the construction and operation of another liquid crystal display device 20 according to an embodiment of the present invention will be described. In the following figures, constituent elements having the same functions as those of the constituent elements of the liquid crystal display device 10 shown in FIG. 1A will be denoted by the same reference numerals, and the descriptions thereof will be omitted.

A liquid crystal layer 22 of the liquid crystal display device 20 is composed of the same liquid crystal molecules as those of the liquid crystal layer 12 of the liquid crystal display device 10. However, regarding the direction in which the liquid crystal molecules fall when a voltage is applied, it is parallel to the direction of light propagation within the light guiding plate 16 in the case of the liquid crystal layer 12, whereas in the case of the liquid crystal layer 22 the direction is orthogonal to the direction of light propagation within the light guiding plate 16. The direction in which the liquid crystal molecules fall can be defined by rubbing a vertical alignment film, for example.

Paying attention to p-polarized light, the refractive index of the liquid crystal layer 22 with respect to the p-polarized light propagating within the light guiding plate 16 is approximately ne in the absence of an applied voltage (left-hand side in the figure). Therefore, the p-polarized light is transmitted through the liquid crystal layer 22, without being totally reflected at the interface between the light guiding plate 16 and the liquid crystal layer 22 satisfying the relationship ns≈ne. The light which has been transmitted through the liquid crystal layer 22 is reflected by the oblique reflective layers 18a so as to be emitted toward the viewer's side.

On the other hand, under an applied voltage (right-hand side in the figure), a voltage which is lower than those in the above-described conventional techniques is applied. Therefore, the orientation state of anchoring layers 22a does not change, but only the orientation state of an intermediate layer 22b changes. Hence, also under an applied voltage, the refractive index of the anchoring layers 22a with respect to p-polarized light is approximately ne, and the p-polarized light enters the liquid crystal layer 22 without being totally reflected at the interface between the light guiding plate 16 and the liquid crystal layer 22 satisfying the relationship ns≈ne. The refractive index with respect to the p-polarized light gradually decreases from the anchoring layers 22a toward the intermediate layer 22b, and approaches no. In or near the intermediate layer 22b where the refractive index changes, the p-polarized light is gradually refracted so as to be directed toward the front face side. This action of the liquid crystal layer 22 makes the p-polarized light appear as if totally reflected within the liquid crystal layer 22. The light which has been refracted within the liquid crystal layer 22 and directed toward the light guiding plate 16 propagates within the light guiding plate 16, and is not emitted toward the viewer's side.

Thus, similarly to in the liquid crystal display device 10, by using p-polarized light, the liquid crystal display device 20 is able to conduct white displaying in a voltage-OFF state or conduct black displaying in a voltage-ON state.

Figure 2:
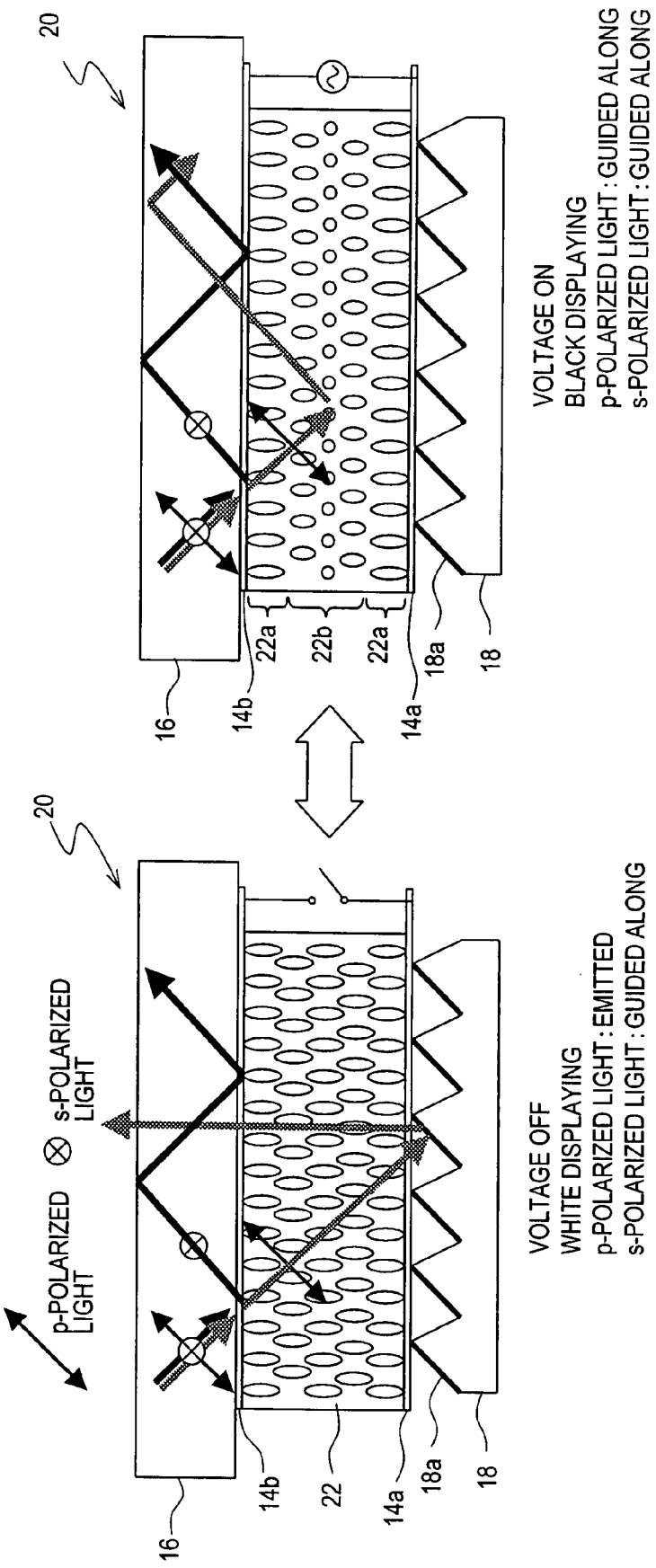
FIG. 2 A schematic diagram for explaining the construction and operation of a liquid crystal display device 20 according to another embodiment of the present invention.

Although the vertical-alignment type liquid crystal layers 12 and 22 illustrated in FIG. 1A and FIG. 2 are liquid crystal layers in which no chiral agent is contained, the viewing angle characteristics can be improved by adding a chiral agent to the liquid crystal layer.

Next, with reference to FIG. 3, the construction and operation of still another liquid crystal display device 30 according to an embodiment of the present invention will be described.

A liquid crystal layer 32 of the liquid crystal display device 30 is a horizontal-alignment type liquid crystal layer, and has positive dielectric anisotropy (Δ∈>0). Similarly to the aforementioned example, a refractive index ns of the light guiding plate 16 is prescribed to be approximately equal to the extraordinary refractive index ne (=n∥>no=n⊥) of the liquid crystal molecules composing the liquid crystal layer 32 (ns≈ne).

Herein, s-polarized light will be paid attention to. The refractive index of the liquid crystal layer 32 with respect to the s-polarized light propagating within the light guiding plate 16 is approximately ne in the absence of an applied voltage (left-hand side in the figure). Therefore, the s-polarized light is transmitted through the liquid crystal layer 32 without being totally reflected at the interface between the light guiding plate 16 and the liquid crystal layer 32 satisfying the relationship ns≈ne. The light which has been transmitted through the liquid crystal layer 32 is reflected by the oblique reflective layers 18a so as to be emitted toward the viewer's side.

On the other hand, under an applied voltage (right-hand side in the figure), a voltage which is lower than those in the above-described conventional techniques is applied. Therefore, the orientation state of anchoring layers 32a does not change, but only the orientation state of an intermediate layer 32b changes. Hence, also under an applied voltage, the refractive index of the anchoring layers 32a with respect to s-polarized light is approximately ne, and the s-polarized light enters the liquid crystal layer 32 without being totally reflected by the interface between the light guiding plate 16 and the liquid crystal layer 32 satisfying the relationship ns≈ne. The refractive index with respect to s-polarized light gradually decreases from the anchoring layers 32a toward the intermediate layer 32b, and approaches no. In or near the intermediate layer 32b where the refractive index changes, the s-polarized light is gradually refracted so as to be directed toward the front face side. This action of the liquid crystal layer 32 makes the s-polarized light appear as if totally reflected within the liquid crystal layer 32. The light which has been refracted within the liquid crystal layer 32 and directed toward the light guiding plate 16 propagates within the light guiding plate 16, and is not emitted toward the viewer's side.

Thus, by using s-polarized light, the liquid crystal display device 30 having the horizontal-alignment type liquid crystal layer 32 is able to conduct white displaying in a voltage-OFF state or conduct black displaying in a voltage-ON state.

Note that, in the liquid crystal display device 30, p-polarized light is totally reflected at the interface between the light guiding plate 16 and the liquid crystal layer 32, irrespective of whether the voltage is ON or OFF. The reason is that the refractive index of the anchoring layers 32a of the liquid crystal layer 32 with respect to p-polarized light is no ($\neq$ns), irrespective of whether the voltage is ON or OFF. Therefore, unlike in the above-described conventional techniques, it is unnecessary to separately provide any construction for eliminating the polarized light which is not used for displaying.

Figure 3:
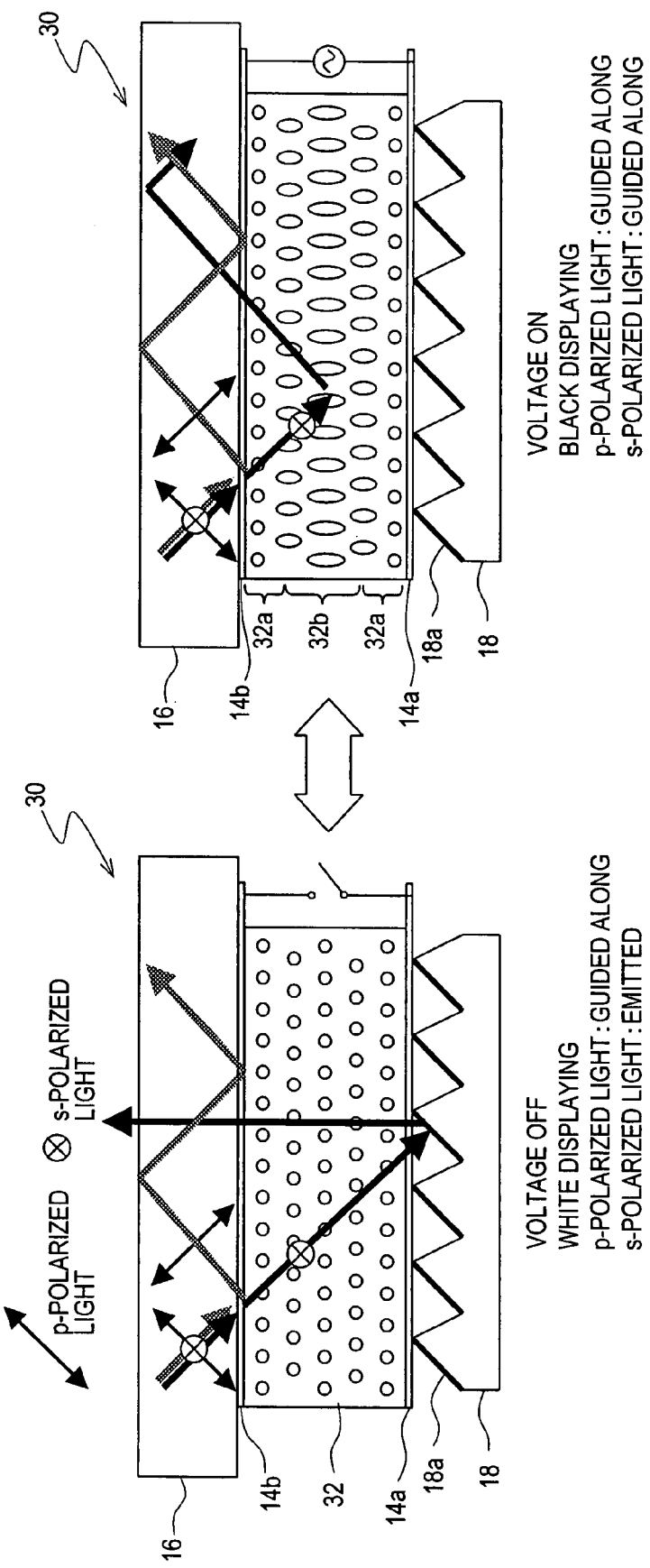
FIG. 3 A schematic diagram for explaining the construction and operation of a liquid crystal display device 30 according to still another embodiment of the present invention.

However, in the case of using a horizontal-alignment type liquid crystal layer, the orientation directions (e.g., the direction of rubbing) of the liquid crystal molecules in the anchoring layers 32a need to be, as shown in FIG. 3, in a direction which is generally orthogonal to the direction of light propagation within the light guiding plate 16. If the orientation directions of the liquid crystal molecules in anchoring layers 42a were parallel to the direction of light propagation within the light guiding plate 16, as in a liquid crystal layer 42 of a liquid crystal display device 40 shown in FIG. 4, both s-polarized light and p-polarized light would always be totally reflected and it would be impossible to conduct displaying, because the orientation state of the anchoring layers 42a never changes even though the orientation state of an intermediate layer 42b might change due to the presence or absence of an applied voltage. Moreover, while a chiral agent may be added to the vertical-alignment type liquid crystal layer in the liquid crystal display device shown in FIG. 1A and FIG. 2, addition of a chiral agent is not preferable in the case of using a horizontal-alignment type liquid crystal layer. If the twist angle of the liquid crystal layer becomes too large, the s-polarized light having been transmitted through the anchoring layer will be refracted by the intermediate layer irrespective of whether the voltage is ON or OFF.

In the above description, electrodes (typically pixel electrodes and a counter electrode) which are provided above and under the liquid crystal layer (i.e., on the front face side and the rear face side) are illustrated as electrodes for applying a voltage across the liquid crystal layer. However, the construction of a liquid crystal display device according to an embodiment of the present invention is not limited thereto. Hereinafter, a more specific construction of a liquid crystal display device according to an embodiment of the present invention will be described.

Figure 5A:
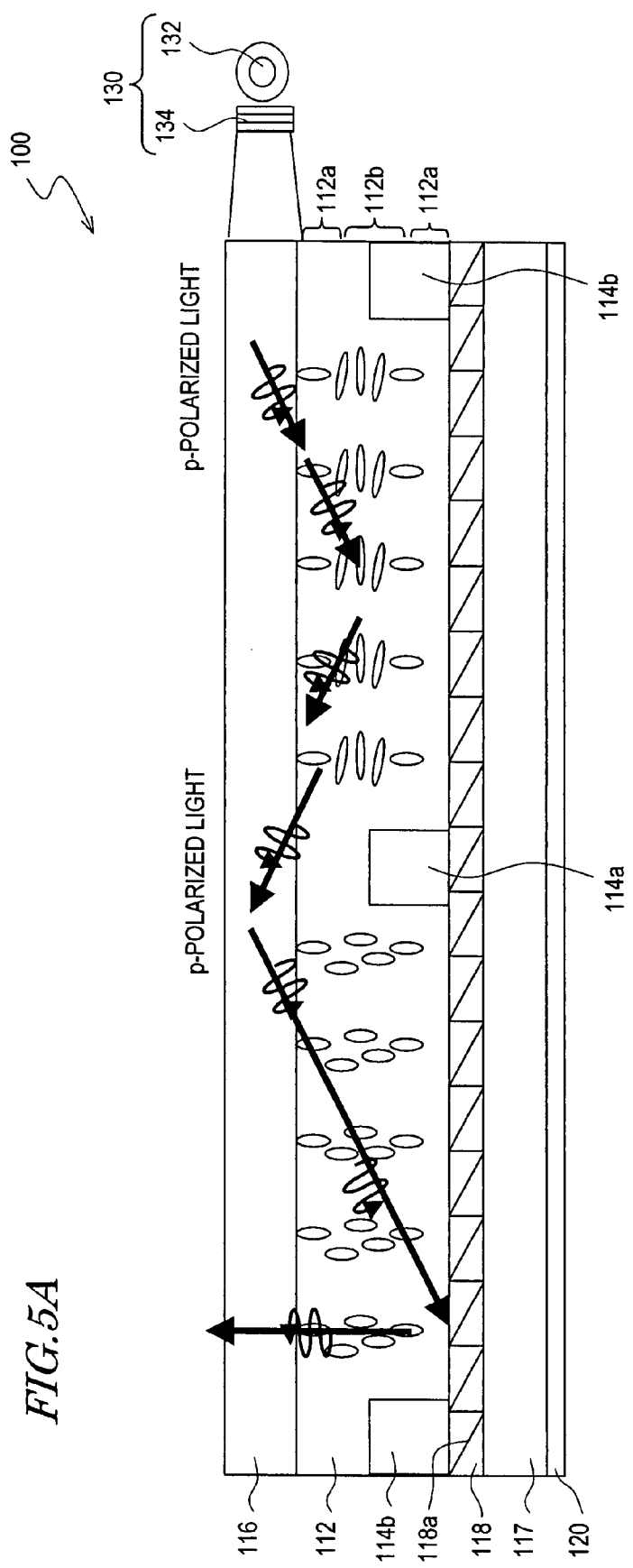
FIG. 5A A diagram for explaining the construction and operation of a liquid crystal display device 100 having a vertical-alignment type liquid crystal layer according to an embodiment of the present invention.
Figure 5B:
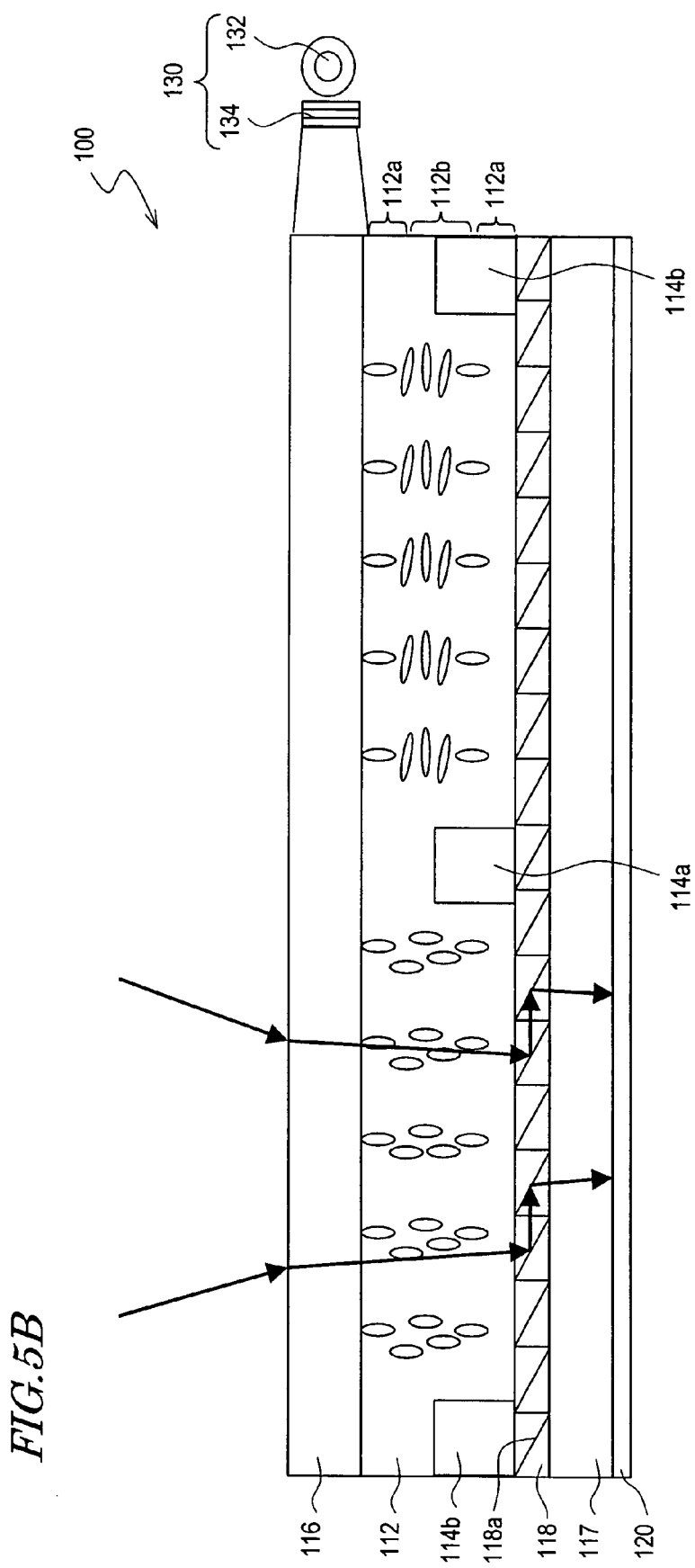
FIG. 5B Another diagram for explaining the construction and operation of the liquid crystal display device 100 having a vertical-alignment type liquid crystal layer according to an embodiment of the present invention.
Figure 6:
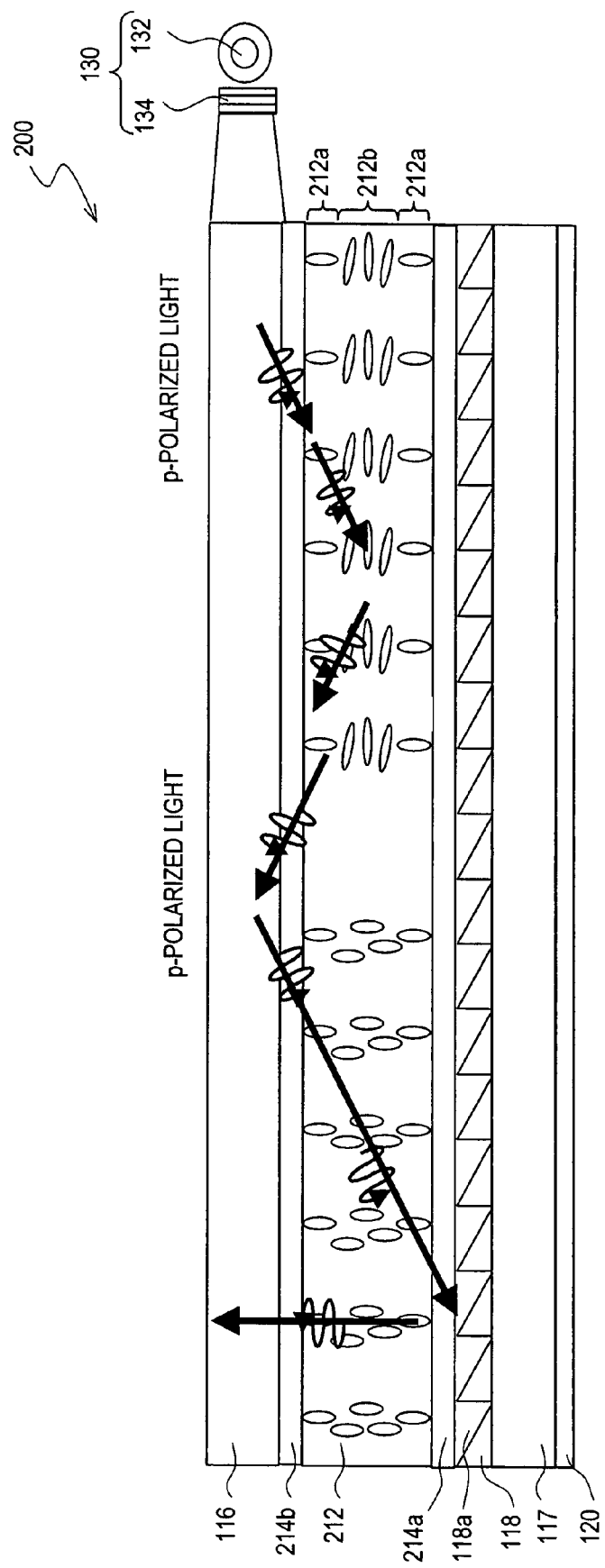
FIG. 6 A diagram for explaining the construction and operation of another liquid crystal display device 200 having a vertical-alignment type liquid crystal layer according to an embodiment of the present invention.

First, with reference to FIG. 5A, FIG. 5B, and FIG. 6, the construction and operation of a display device having a vertical-alignment type liquid crystal layer will be specifically described.

A liquid crystal display device 100 shown in FIG. 5A and FIG. 5B includes a vertical-alignment type liquid crystal layer 112 which is composed of liquid crystal molecules having positive dielectric anisotropy, and presents display by using p-polarized light. Although the dielectric anisotropy of the liquid crystal molecules and the direction of the electric field to be applied across the liquid crystal layer are different, the operation principles of the liquid crystal display device 100 are similar to those of the liquid crystal display device 10 shown in FIG. 1A.

The liquid crystal display device 100 includes a liquid crystal layer 112, a plurality of electrodes 114a and 114b for applying a voltage across the liquid crystal layer 112, and an illuminator 130 for emitting light toward one of the principal faces of the liquid crystal layer 112. The electrodes 114a and 114b are disposed in the liquid crystal layer plane, and the liquid crystal display device 100 is a liquid crystal display device of a so-called lateral electric field mode.

The liquid crystal layer 112 of the liquid crystal display device 100 is provided between a front substrate 116 and a rear substrate 117, such that the front substrate 116 serves also as a light guiding plate for the illuminator 130. Moreover, a reflector 118 is provided on the side of the rear substrate 117 facing the liquid crystal layer 112. The reflector 118 includes oblique reflective layers 118a which are slanted with respect to the display surface (liquid crystal layer plane), and reflects light which has been transmitted through the liquid crystal layer 112 toward the front face side (FIG. 5A). Furthermore, a light absorbing layer 120 is provided on the rear face side of the rear substrate 117, such that the light absorbing layer 120 absorbs unwanted light which has been transmitted through the side faces supporting the oblique reflective layers 118a of the reflector 118 (FIG. 5B). The light to be absorbed by the light absorbing layer 120 is ambient light, and the provision of the light absorbing layer 120 enables direct-viewing type displaying. Even if this is omitted, it can still be used as a liquid crystal display panel for a projection type display device, for example.

The illuminator 130 includes a white light source 132, a polarization-selective film 134, and a front substrate 116 functioning as a light guiding plate. Light (containing s-polarized light and p-polarized light) which is emitted from the white light source 132 enters the polarization-selective film 134, so that only the p-polarized light is emitted toward the front substrate 116. As such a polarization-selective film 134, DBEF manufactured by 3M can be used, for example. By disposing a DBEF so that its transmission direction extends lengthwise (i.e., parallel to the plane of the figure), it is ensured that only the p-polarized light is introduced into the front substrate 116. As has been described with reference to FIG. 1A and the like, the polarization-selective film may be omitted and it is still possible to allow only the p-polarized light to be emitted from the front substrate 116 toward the liquid crystal layer 112, but using the polarization-selective film 134 will make for an improved efficiency of light utilization. Furthermore, by providing a reflective layer (not shown) on the side face that is opposite from the side face of the front substrate 116 at which the light source 132 is disposed, the efficiency of light utilization can be further improved. In this case, it is preferable to provide a ¼ wavelength plate (not shown) between the side face of the front substrate 116 and the reflective layer. As the front substrate 116 functioning also as a light guiding plate, a glass substrate having a refractive index (ns) of 1.62 is used, for example. Note that a similar glass substrate can also be used for the rear substrate 117, without any limitation as to its refractive indices. The front substrate 116 and the rear substrate 117 are not limited to glass substrates, but may be any substrates that are transparent and composed of an optically isotropic material, and polymer films may also be used.

As the liquid crystal material composing the liquid crystal layer 112, a nematic liquid crystal material which has positive refractive index anisotropy (ne=1.6170, no=1.4896) and positive dielectric anisotropy ($\Delta\epsilon$>0) is used. By providing known vertical alignment films (not shown) on both sides of the liquid crystal layer 112, the liquid crystal molecules can be vertically aligned.

As for the electrodes 114a and 114b for applying a voltage across the liquid crystal layer 112, a construction similar to that of a known IPS mode liquid crystal display device can be adopted, for example. Via a switching element (not shown) such as a TFT, a predetermined voltage is supplied to the electrode(s) 114a and/or 114b. The electrodes 114a and 114b are disposed so as to oppose each other along the direction of light propagation within the front substrate 116. In other words, the electrodes 114a and 114b are disposed so that the direction of the electric field generated therebetween is parallel to the direction of light propagation. As a result, the direction in which the liquid crystal molecules fall (tilt) when a voltage is applied across the liquid crystal layer 112 is essentially parallel to the direction of light propagation within the front substrate 116.

By thus adopting the lateral electric field mode, it becomes unnecessary to provide a transparent electrode (typically an ITO layer) between the front substrate 116 and the liquid crystal layer 112, thus resulting in an advantage of losslessness in terms of light transmittance at the interface with the transparent electrodes.

As the reflector 118, a known oblique reflector can be used. For example, it can be obtained by, using e.g. Al or an Al alloy, forming the oblique reflective layers 118a on slopes of a resist layer which has been processed into a predetermined shape. The angle of tilt (the angle with respect to the substrate plane; the angle from the horizontal direction in the figure) of each oblique reflective layer 118a is preferably in the range of no less than 26° and no more than 53°, and may be set to 39°, for example.

The light absorbing layer 120 which is provided on the rear face of the rear substrate 117 is a black resin layer, for example.

With reference to the left-hand side of FIG. 5A, the operation in the absence of an applied voltage will be described.

The refractive index of the liquid crystal layer 112 with respect to the p-polarized light which is guided through the front substrate 116 is approximately ne in the absence of an applied voltage. Therefore, the p-polarized light is transmitted through the liquid crystal layer 112 without being totally reflected at the interface between the front substrate 116 and the liquid crystal layer 112 satisfying the relationship ns≈ne. The light which has been transmitted through the liquid crystal layer 112 is reflected by the oblique reflective layers 118a so as to be emitted toward the viewer's side.

With reference to the right-hand side of FIG. 5A, the operation under an applied voltage will be described.

Under an applied voltage (right-hand side in the figure), the orientation state of anchoring layers 112a does not change, but only the orientation state of an intermediate layer 112b changes. Hence, also under an applied voltage, the refractive index of the anchoring layers 112a with respect to p-polarized light is approximately ne, and the p-polarized light enters the liquid crystal layer 112 without being totally reflected at the interface between the front substrate 116 and the liquid crystal layer 112 satisfying the relationship ns≈ne. The refractive index with respect to p-polarized light gradually decreases from the anchoring layers 112a toward the intermediate layer 112b, and approaches no. In or near the intermediate layer 112b where the refractive index changes, the p-polarized light is gradually refracted so as to be directed toward the front face side. This action of the liquid crystal layer 112 makes the p-polarized light appear as if totally reflected within the liquid crystal layer 112. The light which has been refracted within the liquid crystal layer 112 and directed toward the front substrate 116 propagates within the front substrate 116, and is not emitted toward the viewer's side.

Thus, the liquid crystal display device 100 displays white while no voltage is applied across the liquid crystal layer 112, or conducts black displaying while a voltage is applied across the liquid crystal layer 112.

A liquid crystal display device 200 shown in FIG. 6 differs from the liquid crystal display device 100 shown in FIG. 5A in that a vertical-alignment type liquid crystal layer 212 is composed of liquid crystal molecules having negative dielectric anisotropy, and electrodes 214a and 214b for applying a voltage across the liquid crystal layer 212 are disposed on the rear face side and the front face side of the liquid crystal layer 212. In the following figures, constituent elements having the same functions as those of the constituent elements of the liquid crystal display device 100 will be denoted by the same reference numerals, and the descriptions thereof will be omitted.

The liquid crystal display device 200 also presents display by using p-polarized light, based on operation principles similar to those of the liquid crystal display device 100. The anchoring layers 212a do not change their orientation state in response to a voltage application, but transmit p-polarized light. Voltage application only causes the orientation state of the intermediate layer 212b to change so that the p-polarized light is refracted toward the front substrate 116 side. Thus, white is displayed in the absence of an applied voltage, and black is displayed under an applied voltage.

As for the construction of the electrodes 214a and 214b, a construction similar to that of a known TFT type liquid crystal display device can be adopted, for example. For example, the electrodes 214a are pixel electrodes which are placed in a matrix arrangement, and the electrode 214b is a counter electrode (common electrode). Typically, both are formed of transparent conductive films such as ITO. By adopting this construction, although there is a loss of light due to the electrodes 214a provided between the front substrate 116 and the liquid crystal layer 212, there is no decrease in pixel aperture ratio to be caused by any electrode formed within the pixel from a material of a light-shielding nature, as in the case of the lateral electric field mode.

Figure 7:
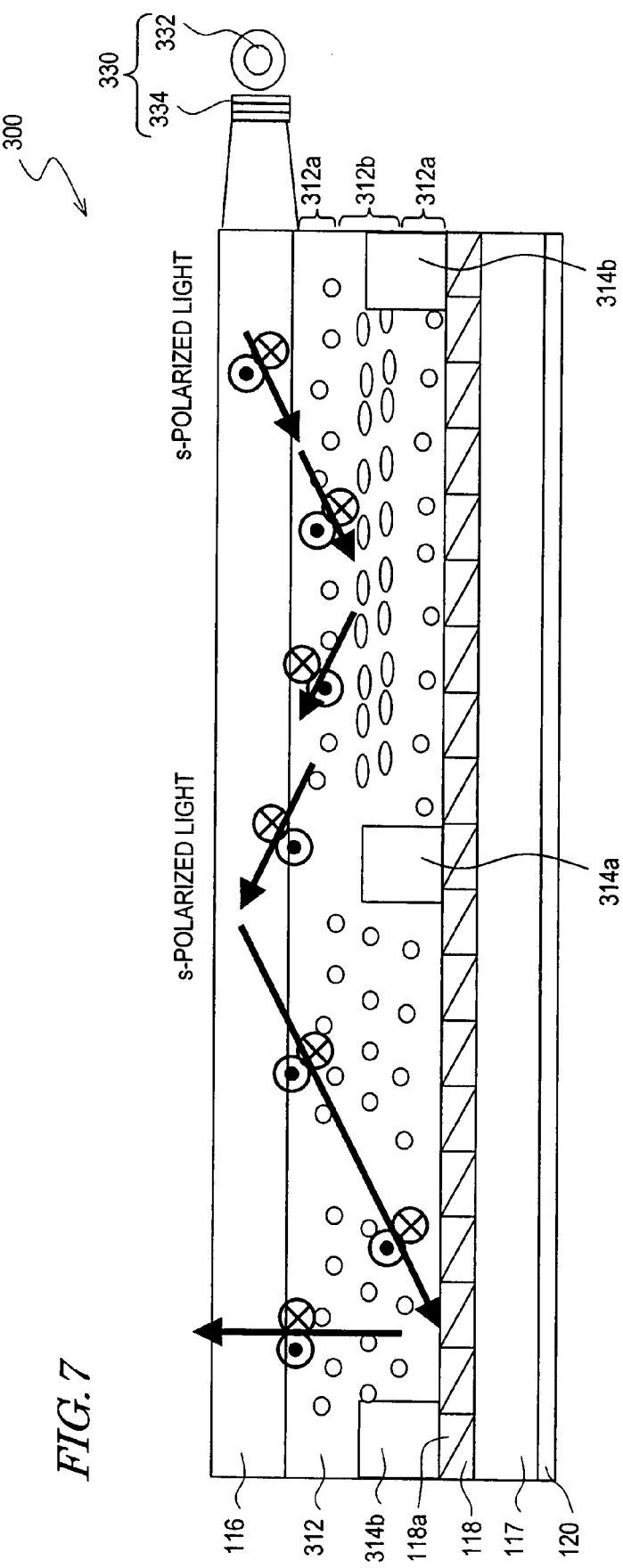
FIG. 7 A diagram for explaining the construction and operation of a liquid crystal display device 300 having a horizontal-alignment type liquid crystal layer according to an embodiment of the present invention.
Figure 8:
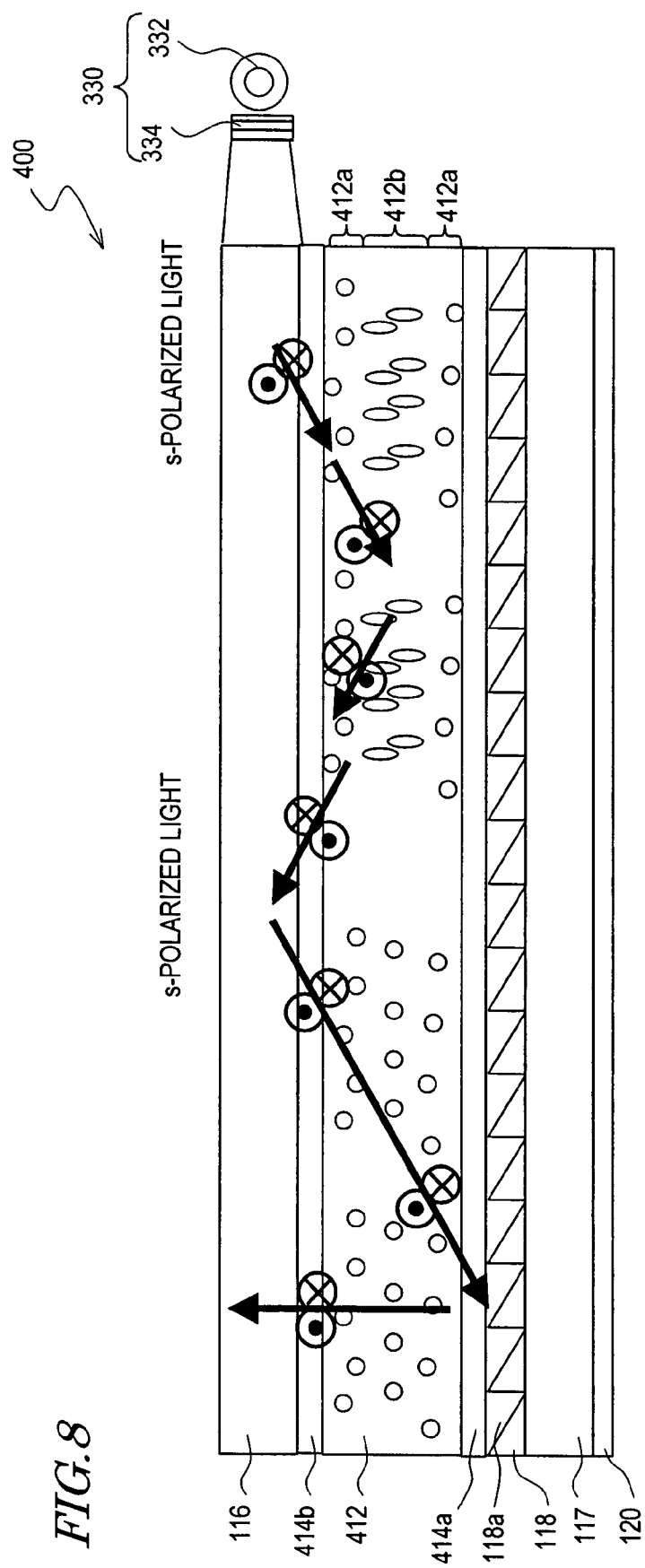
FIG. 8 A diagram for explaining the construction and operation of another liquid crystal display device 400 having a horizontal-alignment type liquid crystal layer according to an embodiment of the present invention.

Next, with reference to FIG. 7 and FIG. 8, the construction and operation of a display device having a horizontal-alignment type liquid crystal layer will be specifically described.

A liquid crystal display device 300 shown in FIG. 7 differs from the liquid crystal display device 100 shown in FIG. 5A in that it comprises a horizontal-alignment type liquid crystal layer 312 composed of liquid crystal molecules having positive dielectric anisotropy, and that an illuminator 330 is constructed so as to emit s-polarized light toward the liquid crystal layer 312. The liquid crystal display device 300 presents display by using s-polarized light, based on operation principles similar to those of the liquid crystal display device 30 shown in FIG. 3. However, as described below, the liquid crystal display device 300 operates in the lateral electric field mode.

The illuminator 330 includes a white light source 332, a polarization-selective film 334, and a front substrate 116 functioning as a light guiding plate. Light (containing s-polarized light and p-polarized light) which is emitted from the white light source 332 enters the polarization-selective film 334, so that only the s-polarized light is emitted toward the front substrate 116. As such a polarization-selective film 334, DBEF manufactured by 3M can be used. By disposing a DBEF so that its transmission direction extends laterally (i.e., perpendicularly to the plane of the figure), it is ensured that only the s-polarized light is introduced into the front substrate 116. The refractive index ns of the front substrate 116 is prescribed to be approximately equal to the extraordinary refractive index ne (=n∥>no=n⊥) of the liquid crystal molecules composing the liquid crystal layer 312 (ns≈ne).

The refractive index of the liquid crystal layer 312 with respect to the s-polarized light propagating within the front substrate 116 is approximately ne in the absence of an applied voltage (left-hand side in the figure). Therefore, the s-polarized light is transmitted through the liquid crystal layer 312 without being totally reflected at the interface between the front substrate 116 and the liquid crystal layer 312 satisfying the relationship ns≈ne. The light which has been transmitted through the liquid crystal layer 312 is reflected by the oblique reflective layers 118a so as to be emitted toward the viewer's side.

On the other hand, under an applied voltage (right-hand side in the figure), the orientation state of an anchoring layers 312a does not change, but only the orientation state of an intermediate layer 312b changes. Hence, also under an applied voltage, the refractive index of the anchoring layers 312a with respect to s-polarized light is approximately ne, and the s-polarized light enters the liquid crystal layer 312 without being totally reflected at the interface between the front substrate 116 and the liquid crystal layer 312 satisfying the relationship ns≈ne. The refractive index with respect to s-polarized light gradually decreases from the anchoring layers 312a toward the intermediate layer 312b, and approaches no. In or near the intermediate layer 312b where the refractive index changes, the s-polarized light is gradually refracted so as to be directed toward the front face side. This action of the liquid crystal layer 312 makes the s-polarized light appear as if totally reflected within the liquid crystal layer 312. The light which has been refracted within the liquid crystal layer 312 and directed toward the front substrate 116 propagates within the front substrate 116, and is not emitted toward the viewer's side.

Thus, the liquid crystal display device 300 having the horizontal-alignment type liquid crystal layer 312 is able to conduct white displaying in a voltage-OFF state or conduct black displaying in a voltage-ON state, by using s-polarized light. Adopting the lateral electric field mode makes it unnecessary to provide a transparent electrode (typically an ITO layer) between the front substrate 116 and the liquid crystal layer 312, thus resulting in an advantage of losslessness in terms of light transmittance at the interface with the transparent electrodes.

Note that, in the liquid crystal display device shown in FIG. 7, the liquid crystal molecules composing the horizontal-alignment type liquid crystal layer 312 may have a negative dielectric anisotropy, and the electrodes 314a and 314b for applying a voltage across the liquid crystal layer 312 may be disposed along a direction which is orthogonal to the direction of light propagation within the front substrate 116 (i.e., the direction perpendicular to the plane of FIG. 7), and the orientation illustrated in FIG. 7 can still be obtained.

A liquid crystal display device 400 shown in FIG. 8 differs from the liquid crystal display device 300 shown in FIG. 7 in that electrodes 414a and 414b for applying a voltage across a liquid crystal layer 412 are disposed on the rear face side and the front face side of the liquid crystal layer 412. The liquid crystal layer 412 is composed of liquid crystal molecules having positive dielectric anisotropy.

The liquid crystal display device 400 presents display by using s-polarized light, based on operation principles similar to those of the liquid crystal display device 30 shown in FIG. 3. The anchoring layers 412a do not change their orientation state in response to a voltage application, but transmit s-polarized light. Voltage application only causes the orientation state of the intermediate layer 412b to change so that the s-polarized light is refracted toward the front substrate 116 side. Thus, white is displayed in the absence of an applied voltage, and black is displayed under an applied voltage.

Each of the above-described liquid crystal display devices 100 to 400 is a frontlight-type reflection type liquid crystal display device having an illuminator which is disposed on the front face side of the liquid crystal layer. However, the present invention is not limited thereto. For example, a backlighted transmission type liquid crystal display device 500 as shown in FIG. 9 can be constructed.

In the case of the frontlight type, only an edge-light type illuminator, which is to be disposed at an end face of the display panel, can be employed as the light source, and this hinders application to large-sized display devices from the standpoint of light amount. However, adopting the backlight type makes it possible to dispose the light source in the plane of the display panel, whereby constraints concerning the number of light sources are greatly alleviated, which is advantageous from the standpoint of light amount.

Figure 9:
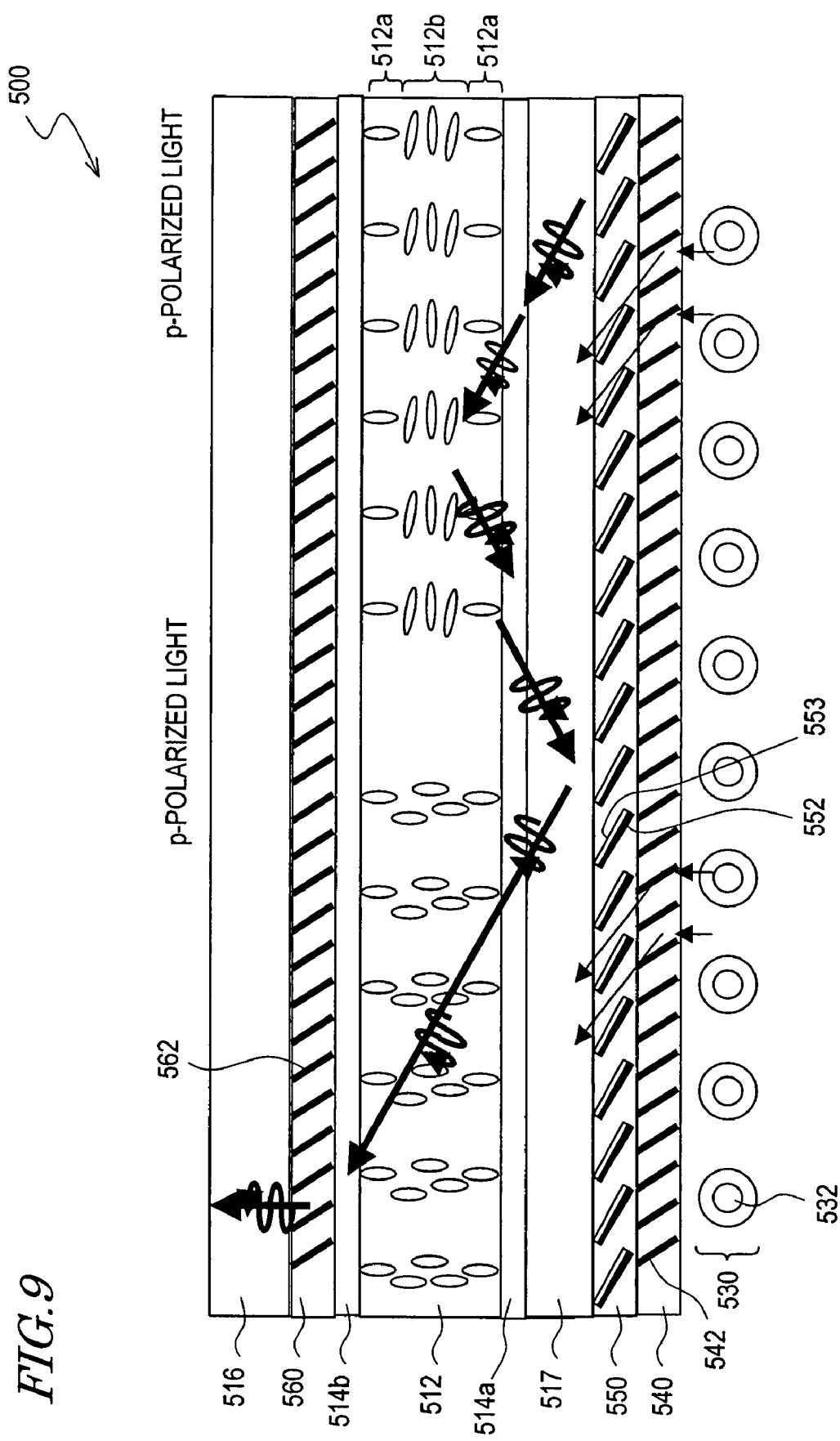
FIG. 9 A diagram for explaining the construction and operation of a backlight-type liquid crystal display device 500 according to an embodiment of the present invention.

A liquid crystal display device 500 shown in FIG. 9 includes a vertical-alignment type liquid crystal layer 512 composed of liquid crystal molecules having negative dielectric anisotropy, and presents display by using p-polarized light. The principles under which the liquid crystal layer 512 of the liquid crystal display device 500 transmits p-polarized light in the absence of an applied voltage and refracts p-polarized light toward the incident side under an applied voltage are similar to those of the liquid crystal display device 10 shown in FIG. 1A.

The liquid crystal display device 500 includes the liquid crystal layer 512, a plurality of electrodes 514a and 514b for applying a voltage across the liquid crystal layer 512, and an illuminator (backlight) 530 disposed on the rear face side of the liquid crystal layer 512. The electrodes 514a and 514b are disposed on the front face side and the rear face side of the liquid crystal layer 512, so as to oppose each other via the liquid crystal layer 512. The illuminator 530 includes a plurality of cold-cathode tubes 532, for example.

The liquid crystal layer 512 is provided between a front substrate 516 and a rear substrate 517, and a reflector 540 is provided between the rear substrate 517 and the illuminator 530. The reflector 540 includes oblique reflective layers 542 which are slanted with respect to the display surface (liquid crystal layer plane), and reflects light which has been emitted from the illuminator 530, light within the rear substrate 517, in an oblique direction. The light which has been reflected in an oblique direction by the reflector 540 enters a louver 550, and is reflected by oblique reflective layers 552 of the louver 550, so as to enter the rear substrate 517.

The refractive index ns of the rear substrate 517 is prescribed to be approximately equal to the extraordinary refractive index ne (=n∥) of the liquid crystal molecules composing the liquid crystal layer 512 (ns≈ne). As has been described with reference to FIG. 1A, the s-polarized light is totally reflected at the interface between the rear substrate 517 and the liquid crystal layer 512, such that only the p-polarized light enters the liquid crystal layer 512. By providing a polarization-selective film (e.g., a DBEF film) between the louver 550 and the rear substrate 517, it is ensured that only the p-polarized light is emitted toward the liquid crystal layer 512.

In the absence of an applied voltage (left-hand side in the figure), the p-polarized light having entered the liquid crystal layer 512 is transmitted through the liquid crystal layer 512, reflected by oblique reflective layers 562 of a reflector 560 which is provided on the front face side of the liquid crystal layer 512, and emitted toward the viewer's side. White is displayed in this state. Note that a scattering layer may be used instead of the reflector 560.

On the other hand, under an applied voltage (right-hand side in the figure), the orientation state of anchoring layers 512a does not change, but the orientation state of an intermediate layer 512b changes. The refractive index with respect to p-polarized light gradually decreases from the anchoring layers 512a toward the intermediate layer 512b, and approaches no. In or near the intermediate layer 512b where the refractive index changes, the p-polarized light is gradually refracted, so as to be directed toward the rear face side. The light which has been refracted within the liquid crystal layer 512 and directed toward the rear substrate 517 propagates within the rear substrate 517, or is absorbed by light absorbing layers 553 in the louver 550, and thus is not emitted toward the viewer's side. Black is displayed in this state.

The construction of a backlighted transmission type liquid crystal display device is not limited to the above. Any combination with the liquid crystal layers and electrode positionings of the liquid crystal display devices which have been described with reference to FIG. 1A to FIG. 8 can be adopted.

When provided with color filters, the above-described liquid crystal display devices are able to conduct color displaying. The positions at which to provide color filters may be arbitrary. However, rather than between the liquid crystal layer and the illuminator (light guiding plate), they are preferably provided between the reflective layers and the liquid crystal layer. In other words, a preferable construction is where the light which has been transmitted through the liquid crystal layer passes through the color filters while no voltage is applied across the liquid crystal layer.

Figure 10:
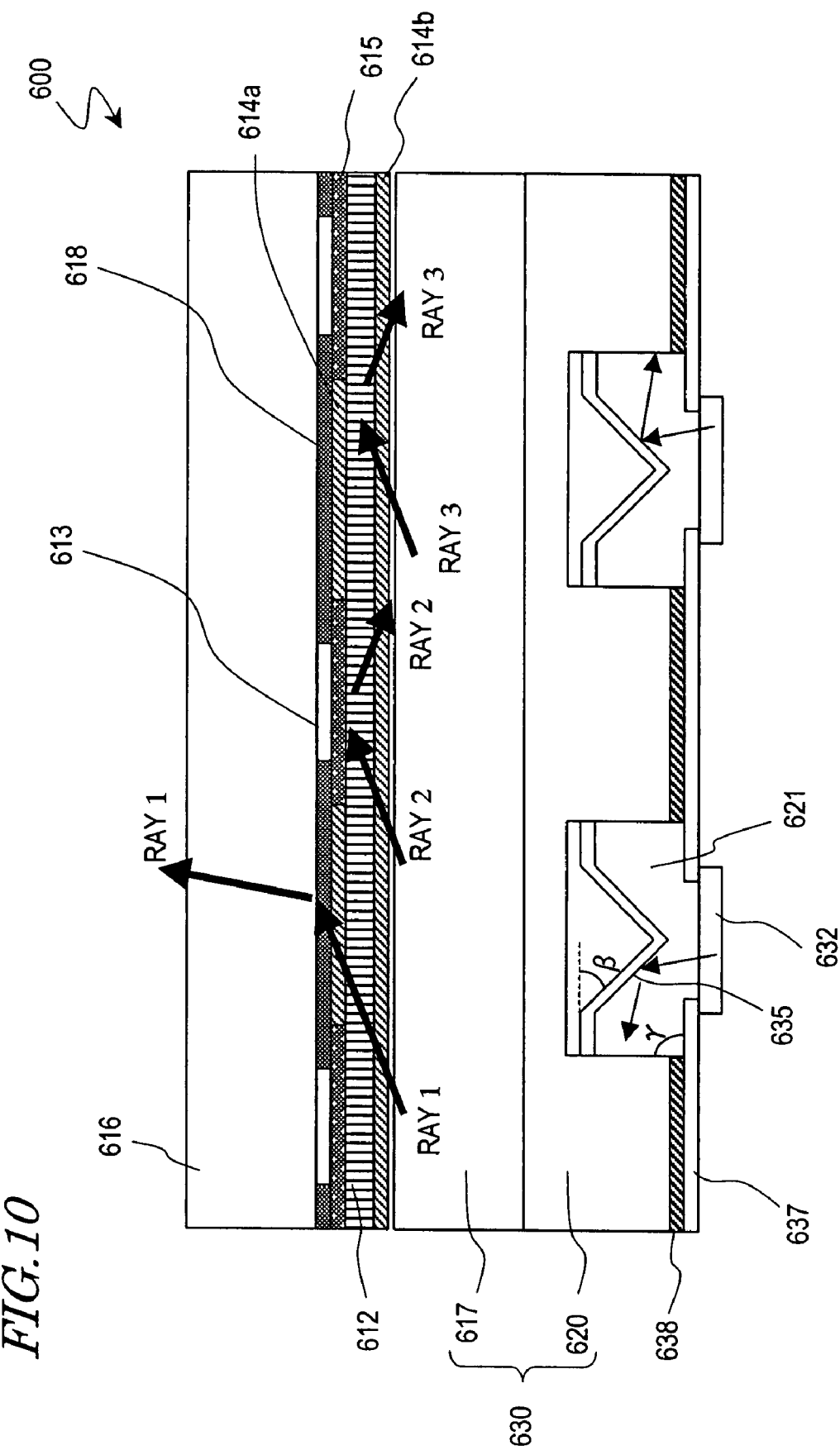
FIG. 10 A schematic diagram for explaining the construction and operation of another backlight-type liquid crystal display device 600 according to an embodiment of the present invention.
Figure 11:
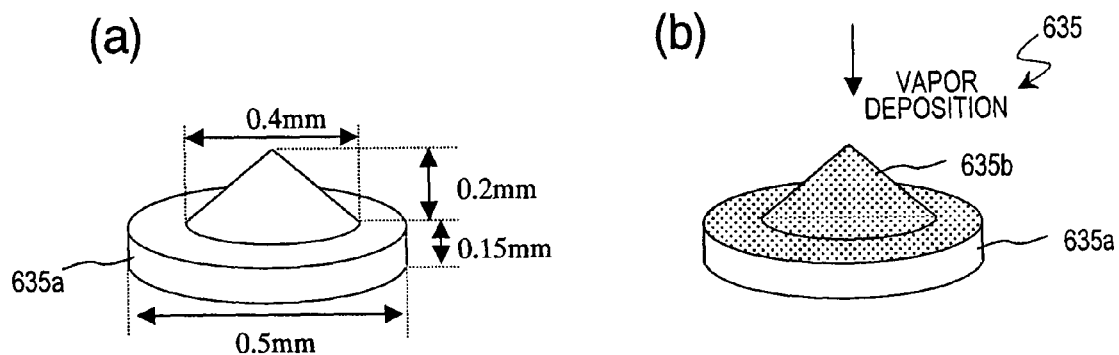
FIGS. 11 (*a*) and (*b*) are schematic diagrams for explaining the construction of a reflecting structure 635 which is used for the liquid crystal display device 600.

With reference to FIG. 10 and FIG. 11, the structure and operation of another backlight-type liquid crystal display device 600 according to an embodiment of the present invention will be described.

FIG. 10 is a schematic diagram for explaining the construction and operation of a liquid crystal display device 600. FIGS. 11(a) and (b) are schematic diagrams for describing the construction of a reflecting structure 635 used for the liquid crystal display device 600. Herein, as in the above examples, a construction will be illustrated in which, using a vertical-alignment type liquid crystal layer composed of liquid crystal molecules having negative dielectric anisotropy, a voltage is applied through a pair of electrodes which are provided on the front face and the rear face of the liquid crystal layer. Without being limited to this, a construction may be used in which a lateral electric field is applied across a vertical-alignment type liquid crystal layer composed of liquid crystal molecules having positive dielectric anisotropy as in the liquid crystal display device shown in FIG. 5A, or a horizontal-alignment type liquid crystal layer may be used as shown in FIG. 7 or FIG. 8.

As shown in FIG. 10, the liquid crystal display device 600 includes a liquid crystal layer 612, pixel electrodes 614a and a counter electrode 614b for applying a voltage across the liquid crystal layer 612, and an illuminator (backlight) 630 for emitting light toward a principal face of the liquid crystal layer 612 at the rear face side (i.e., the opposite side to the viewer's side). The liquid crystal layer 612 is provided between a front substrate 616 and a rear substrate 617, such that the rear substrate 617 serves also as a light guiding plate for the illuminator 630. The front substrate 616 and the rear substrate 617 have a thickness of 0.7 mm, for example, and the rear substrate 617 has a refractive index of about 1.6, for example. A color filter layer 618 is provided on the side of the front substrate 616 facing the liquid crystal layer 612, such that the liquid crystal layer 612 controls whether the light which has been emitted from the backlight 630 is to enter the color filter layer 618 or not. The liquid crystal layer 612 can be formed in a similar manner to the above-described examples, for example. The color filter layer includes e.g. red, green, and blue color filters corresponding to each pixel. The construction of the illuminator 630 will be described later.

The front substrate 616 includes circuit elements (TFT elements, wiring line, etc.) 613 for controlling the voltage to be applied across the liquid crystal layer 612, such that the color filter layer 618 is provided in the region where these are not formed.

On the color filter layer 618, pixel electrodes 614a composed of a transparent conductive layer are formed by a known method. As the transparent conductive layer, ITO or IZO can be used. A layer having a lower refractive index than the extraordinary refractive index ne of the liquid crystal material of the liquid crystal layer 612, e.g., a silicon oxide layer 615, is provided so as to cover the circuit elements 613. The silicon oxide layer 615 prevents the light which has traveled through the liquid crystal layer 612 from striking the circuit elements 613 (i.e., so that the light having traveled through the liquid crystal layer 612 is reflected at the interface). In particular, in the case of a normally-white mode (NW mode) display device, it is preferable to provide the silicon oxide layer 615 for shielding because the contrast ratio would decrease if light were transmitted through the region where the circuit elements 613 are formed. Moreover, a gap may exist between the silicon oxide layer 615 and the pixel electrodes 614a. However, from the standpoint of the aperture ratio (efficiency of light utilization) of the display device, it is preferable that the pixel electrodes 614a are large, and it is preferable for the silicon oxide layer 615 to sufficiently shield light from striking the circuit elements 613. Note that predetermined alignment films (not shown) are provided on the surfaces of the pixel electrodes 614a and the silicon oxide layer 615 and the counter electrode 614b facing the liquid crystal layer 612.

Next, the construction of the backlight 630 will be described.

The backlight 630 includes the rear substrate 617 functioning as a light guiding plate and a light guiding plate 620 provided on the rear face thereof. Herein, the light guiding plate 620 has the same refractive index (about 1.6) as the refractive index of the rear substrate 617, and the light guiding plate 620 and the rear substrate 617 are in direct contact without any intervening low-refractive index substance, so as to together function as a light guiding plate. The rear substrate 617 and the light guiding plate 620 may be formed of the same material, and may be integrally formed.

The light guiding plate 620 is a light guiding plate of a parallel plate type which has holes (recesses) 621 in the rear face thereof, the holes (recesses) 621 having generally vertical side faces. Reflecting structures 635 are provided within the holes 621 in the light guiding plate 620. Moreover, a light absorbing layer 637 is disposed on the rear face side of the light guiding plate 620. The light guiding plate 620 and the light absorbing layer 637 are disposed with an adhesion layer 638 having a low refractive index interposed therebetween. Instead of the adhesion layer 638, an air layer may be formed. By ensuring that the light propagating within the light guiding plate 620 is totally reflected at the interface with the adhesion layer (air layer) 638, the efficiency of light utilization can be enhanced. For similar purposes, it is preferable to form reflective interfaces at the end faces of the light guiding plate 620 and the rear substrate 617. For example, reflective layers may be provided at the end faces of the light guiding plate 620 and the rear substrate 617. Moreover, the light absorbing layer 637 absorbs ambient light. By providing the light absorbing layer 637, it becomes possible to conduct good dark displaying.

The light absorbing layer 637 has apertures in positions corresponding to the holes 621 in the rear face of the light guiding plate 620. In the rear face of the light absorbing layer 637, a plurality of light sources (e.g., LEDs) 632 are provided for emitting white light toward the reflecting structures 635 within the holes 621 in the light guiding plate 620. Between each light source 632 and each reflecting structure 635 is air, for example. The density with which the light sources 632 are provided may be set according to the required light amount, and the like. However, the distance between adjoining light sources 632 is preferably about 50 mm to about 100 mm, for example. This is in order to ensure that the proportion of light propagating within the light guiding plate 620 and the rear substrate 617 falls within an appropriate range.

As shown in FIG. 11, the reflecting structure 635 includes a main body 635a having a light absorbing function and a reflective layer 635b provided on the surface of the main body 635a. The main body 635a has a conical side face, and the reflective layer 635b, provided on the side face reflects the light having been emitted from the light source 632 to be guided into the light guiding plate 620. The main body 635a, which has a light absorbing function, of the having reflecting structure 635 faces the liquid crystal layer 612, such that it appears black when viewed from the front substrate 616. The reflecting structure 635 is caused to adhere to the light guiding plate 620 (refractive index about 1.6) with a colorless and transparent adhesive (not shown) having a refractive index of about 1.5, for example.

The angle of tilt β of the reflective layer 635b of each reflecting structure 635 with respect to the display surface is prescribed to be about 45°±5°, such that the light which is emitted from the light source 632 is reflected essentially in parallel to the display surface. The angle of tilt γ of the side face of each hole 621 in the light guiding plate 620 with respect to the display surface is set at about 60°, such that the principal ray of the light which has been reflected by the reflective layer 635b strikes the side face of the hole 621 essentially perpendicularly. At this time, the light enters from the air (which is a medium having a small refractive index) into the light guiding plate 620, and therefore the light enters the light guiding plate 620 without having much expanse. The light having entered the light guiding plate 620 propagates within the light guiding plate 620 and the rear substrate 617, while repeating reflections at the interface between the light guiding plate 620 and the adhesion layer (air layer) 638, the interfaces between the air and the end faces of the light guiding plate 620 and the rear substrate 617 and the principal face of the rear substrate 617 facing the liquid crystal layer 612, and the interface between the light guiding plate 620 and the adhesion layer (having a refractive index of about 1.5) via which the reflecting structure 635 and the light guiding plate 620 adhere to each other.

The light guiding plate 620 has a thickness of 0.7 mm, for example. Each hole 621 provided in the light guiding plate 620 has a depth of about 0.6 mm, for example, and is in a circular form with a diameter of 0.7 mm. The diameter of each aperture provided in the light absorbing layer 637 is preferably slightly larger than the light-emitting portion of the light source 632. In the case where an LED whose light-emitting portion has a diameter of 0.3 mm is used as each light source 632, each aperture (throughhole) in the light absorbing layer 637 has a diameter of about 0.5 mm.

Each reflecting structure 635 has a structure as shown in FIGS. 11(a) and (b), for example. The main body 635a is produced by molding acrylic resin containing a black pigment, for example, and is shaped so that a cone having a height 0.2 mm and an angle of tilt of about 45 (45°±5°) is stacked on a disk having a diameter of 0.5 mm and a thickness of 0.15 mm. As shown in FIG. 11(b), by vapor-depositing a metal film having a high reflectance such as silver or aluminum on the surface of the main body 635a where the cone is provided, the reflecting structure 635 having the reflective layer 635b is obtained. Although a cone is preferable for reflecting light in an isotropic manner within the display surface, it may also be a polypyramid. In this case, the side faces of each hole 621 are preferably disposed so as to oppose the reflective layers.

The basic operation principles of the liquid crystal display device 600 are similar to those of the above-described liquid crystal display devices, and will be described briefly.

The light propagating through the light guiding plate 620 and the rear substrate 617 enters the liquid crystal layer 612 across which no voltage is being applied, and passes through the liquid crystal layer 612 (e.g., FIG. 5A). The light having passed through the liquid crystal layer 612 enters the color filter layer 618, whereby light of a predetermined color is emitted toward the viewer's side (ray 1 in the figure). On the other hand, the light entering the liquid crystal layer 612 with a voltage being applied thereto is reflected within the liquid crystal layer 612 (e.g., FIG. 5A), and again propagates within the rear substrate 617 and the light guiding plate 620 (ray 3 in the figure). Moreover, the light entering the silicon oxide layer 615 is reflected at the interface between the silicon oxide layer 615 and the liquid crystal layer 612, and again propagates within the rear substrate 617 and the light guiding plate 620 (ray 2 in the figure). Thus, by using the vertical-alignment type liquid crystal layer 612 composed of a nematic liquid crystal material having negative dielectric anisotropy, it is possible to present display in the NW mode.

Any of the above-described combinations of liquid crystal layers and polarized light can be adopted, but it is particularly preferable to construct an NW mode display device employing a vertical-alignment type liquid crystal layer. The reason is that, when a vertical-alignment type liquid crystal layer is used, the apparent refractive index of liquid crystal molecules becomes independent of the direction (direction in the display surface) of the light entering the liquid crystal layer, so that the switching between a transmitting state or a non-transmitting state of light becomes immune to the influence of the direction of light.

The display device according to the present invention is not limited to the aforementioned reflection type or transmission type liquid crystal display devices, but may be a fluorescent display device which utilizes fluorescence for displaying.

Figure 12:
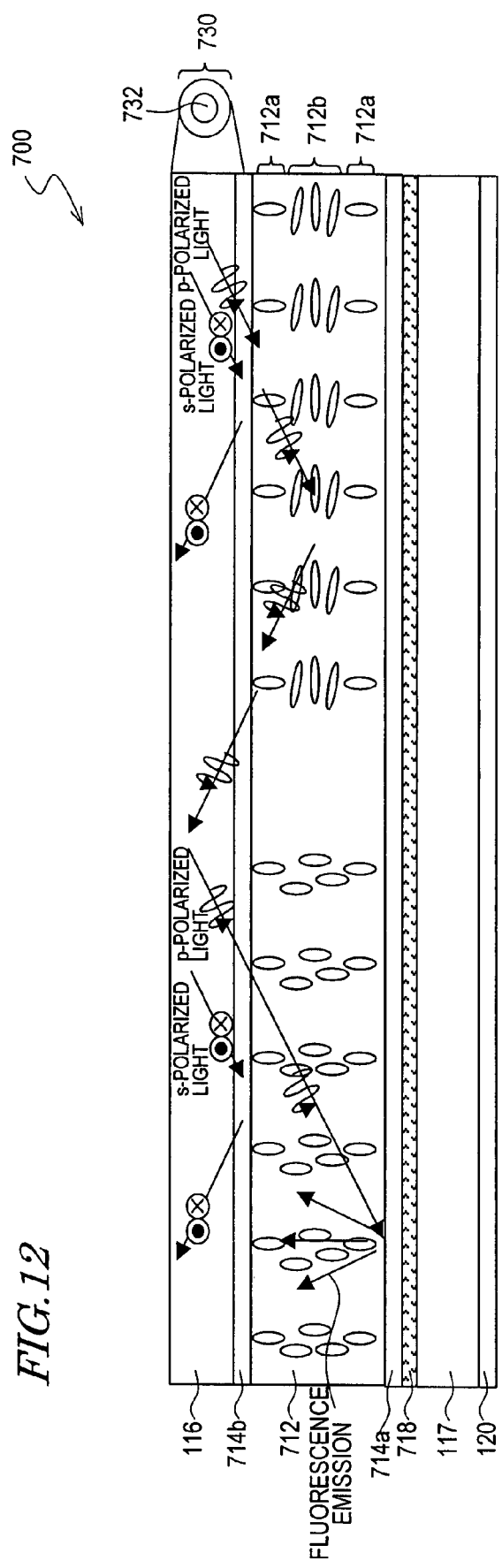
FIG. 12 A diagram for explaining the construction and operation of a fluorescent display device 700 according to an embodiment of the present invention.

For example, a fluorescent display device 700 shown in FIG. 12 switches between a state where p-polarized light is transmitted through the liquid crystal layer 712 and a state where it is not transmitted, based on the same operation principles as those of the liquid crystal display device 200 which has been described with reference to FIG. 6.

The fluorescent display device 700 includes a liquid crystal layer 712; a plurality of electrodes 714a and 714b for applying a voltage across the liquid crystal layer 712; and an illuminator 730 for emitting light toward one of the principal faces of the liquid crystal layer 712.

The liquid crystal layer 712 is provided between a front substrate 116 and a rear substrate 117, such that the front substrate 116 serves also as a light guiding plate for the illuminator 730. Moreover, a fluorophore layer 718 is provided on the liquid crystal layer 712 side of the rear substrate 117. Furthermore, a light absorbing layer 120 is provided on the rear face side of the rear substrate 117. The light absorbing layer 120 absorbs ambient light. By providing the light absorbing layer 120, it becomes possible to conduct direct-viewing type displaying.

A light source 732 of the illuminator 730 emits light which excites the fluorophore in the fluorophore layer 718. In the case where cadmium telluride is used as the fluorophore layer 718, the excitation light has a wavelength of 405 nm. As necessary, a wavelength selection filter may be provided between the light source 732 and the incident side face of the front substrate 116. The fluorophore layer 718 can be formed by a method which is described in Gao et al., Journal of Physical Chemistry B, vol. 102, p. 8360 (1998).

The excitation light (containing p-polarized light and s-polarized light) which is emitted from the light source 732 propagates within the front substrate 116. Herein, the refractive index ns of the front substrate 116 is prescribed to be approximately equal to the extraordinary refractive index ne (=n∥) of the liquid crystal molecules composing the liquid crystal layer 712 (ns≈ne). The liquid crystal molecules composing the liquid crystal layer 712 has negative dielectric anisotropy (Δ∈<0) and positive refractive index anisotropy (ne>no).

As has been described with reference to FIG. 1A, the refractive index of the liquid crystal layer 712 with respect to the p-polarized light propagating within the front substrate 116 is approximately ne in the absence of an applied voltage (left-hand side in the figure). Therefore, the p-polarized light is transmitted through the liquid crystal layer 712 without being totally reflected at the interface between the front substrate 116 and the liquid crystal layer 712 satisfying the relationship ns≈ne. The light which has been transmitted through the liquid crystal layer 712 enters the fluorophore layer 718, and excites the fluorophore. The fluorophore layer 718 undergoes fluorescence emission, and this fluorescence is transmitted through the liquid crystal layer 712 so as to be emitted toward the viewer's side, thus conducting bright displaying. The displayed color at this time depends on the wavelength of the fluorescence. By appropriately selecting the fluorophore, it becomes possible to display a predetermined color. Moreover, a construction for emitting white light and a color filter may also be combined.

On the other hand, under an applied voltage (right-hand side in the figure), the orientation state of anchoring layers 712a does not change, but only the orientation state of the intermediate layer 712b changes. Hence, also under an applied voltage, the refractive index of the anchoring layers 712a with respect to p-polarized light is approximately ne, and p-polarized light enters the liquid crystal layer 712 without being totally reflected at the interface between the front substrate 116 and the liquid crystal layer 712 satisfying the relationship ns≈ne. The refractive index with respect to p-polarized light gradually decreases from the anchoring layers 712a toward the intermediate layer 712b, and approaches no. In or near the intermediate layer 712b where the refractive index changes, the p-polarized light is gradually refracted, so as to be directed toward the front face side. The light which has been refracted within the liquid crystal layer 712 and directed toward the front substrate 116 propagates within the front substrate 116, and is not emitted toward the viewer's side.

Moreover, the light which enters from the surroundings passes through the liquid crystal layer 712 and the fluorophore layer 718, and is absorbed by the light absorbing layer 120. Provision of the light absorbing layer 120 makes for an improved display quality.

Thus, by using p-polarized light, the fluorescent display device 700 is able to conduct white displaying (bright displaying) in a voltage-OFF state, or conduct black displaying (dark displaying) in a voltage-ON state.

Note that, in the fluorescent display device 700, s-polarized light is totally reflected at the interface between the front substrate 116 and the liquid crystal layer 712, irrespective of whether the voltage is ON or OFF, and does not enter the liquid crystal layer 712.

INDUSTRIAL APPLICABILITY

According to the present invention, there is provided a display device which is capable of presenting display by switching between a transmitting state and a non-transmitting state with respect to light entering the liquid crystal layer, with a voltage which is low enough to permit use of conventional transistors. The display device according to the present invention can also be used as a direct-viewing type display device.

The invention claimed is:

1. A display device comprising:
   a liquid crystal layer having a first principal face and a second principal face opposing each other;
   a plurality of electrodes for applying a voltage across the liquid crystal layer; and
   an illuminator for emitting light toward one of the first principal face and the second principal face of the liquid crystal layer, wherein,
   when a predetermined voltage is applied, the liquid crystal layer forms an intermediate layer containing liquid crystal molecules which are oriented in a different direction from that of liquid crystal molecules in an anchoring layer near the one principal face, and causes linearly-polarized light which has been transmitted through the anchoring layer near the one principal face to be refracted toward the one principal face in or near the intermediate layer; and
   white is displayed while no voltage is applied across the liquid crystal layer, and black displaying is conducted while a voltage is applied across the liquid crystal layer.

2. The display device of claim 1, wherein a refractive index of the intermediate layer with respect to the linearly-polarized light which has been transmitted through the anchoring layer is smaller than a refractive index of the anchoring layer.

3. The display device of claim 1, wherein the linearly-polarized light which is emitted from the illuminator toward the one principal face has a component which is parallel to major axes of the liquid crystal molecules in the anchoring layer.

4. The display device of claim 1, wherein,
   the liquid crystal layer is a vertical-alignment type liquid crystal layer containing liquid crystal molecules having positive dielectric anisotropy;
   the plurality of electrodes are a plurality of electrodes for applying a lateral electric field across the liquid crystal layer; and
   the linearly-polarized light is p-polarized light.

5. The display device of claim 1, wherein,
   the liquid crystal layer is a vertical-alignment type liquid crystal layer containing liquid crystal molecules having negative dielectric anisotropy;

the plurality of electrodes are a plurality of electrodes disposed so as to oppose each other via the liquid crystal layer; and the linearly-polarized light is p-polarized light.

6. The display device of claim 1, wherein, the liquid crystal layer is a horizontal-alignment type liquid crystal layer containing liquid crystal molecules having positive dielectric anisotropy;

the plurality of electrodes are a plurality of electrodes for applying a lateral electric field across the liquid crystal layer; and the linearly-polarized light is s-polarized light.

7. The display device of claim 1, wherein, the liquid crystal layer is a horizontal-alignment type liquid crystal layer containing liquid crystal molecules having positive dielectric anisotropy;

the plurality of electrodes are a plurality of electrodes disposed so as to oppose each other via the liquid crystal layer; and the linearly-polarized light is s-polarized light.

8. The display device of claim 1, wherein, the illuminator is disposed on the second principal face side of the liquid crystal layer; and the display device further comprises an oblique reflective layer provided on the first principal face side of the liquid crystal layer.

9. The display device of claim 8, further comprising a light absorbing layer on the opposite side of the oblique reflective layer from the liquid crystal layer.

10. The display device of claim 1, wherein, the illuminator is disposed on the first principal face side of the liquid crystal layer; and the display device further comprises a first oblique reflective layer provided between the illuminator and the first principal face of the liquid crystal layer.

11. The display device of claim 10, further comprising a light absorbing layer on the liquid crystal layer side of the first oblique reflective layer.

12. The display device of claim 10, further comprising a second oblique reflective layer or scattering layer provided on the second principal face side of the liquid crystal layer.

13. The display device of claim 1, wherein the illuminator includes a light source and a light guiding plate.

14. The display device of claim 13, wherein the illuminator further includes a polarization-selective film between the light source and the light guiding plate.

15. The display device of claim 13, wherein the illuminator further includes a reflective layer disposed so as to oppose the light source via the light guiding plate.

16. The display device of claim 15, wherein the illuminator further includes a ¼ wavelength plate between the reflective layer and the light guiding plate.

17. The display device of claim 1, further comprising a color filter layer disposed on a front face side of the liquid crystal layer, wherein the illuminator is disposed on a rear face side of the liquid crystal layer.

18. The display device of claim 17, wherein, the illuminator includes:

a light guiding plate of a parallel plate type, having a plurality of holes on a rear face thereof;

a reflecting structure provided in each of the plurality of holes; and a plurality of light sources each emitting light toward the reflecting structure.

19. The display device of claim 18, further comprising a light absorbing layer on the rear face side of the light guiding plate.

20. The display device of claim 19, wherein a layer having a lower refractive index than that of the light guiding plate is provided between the light guiding plate and the light absorbing layer.

* * * * *